(12) United States Patent
Nayak et al.

(10) Patent No.: US 10,896,334 B2
(45) Date of Patent: Jan. 19, 2021

(54) METHOD AND SYSTEM OF A MACHINE LEARNING MODEL FOR DETECTION OF PHYSICAL DIVIDERS

(71) Applicant: HERE GLOBAL B.V., Eindhoven (NL)

(72) Inventors: Amarnath Nayak, Mumbai (IN); Leon Stenneth, Chicago, IL (US); Alex Averbuch, Buffalo Grove, IL (US)

(73) Assignee: HERE Global B.V., Eindhoven (NL)

( * ) Notice: Subject to any disclaimer, the term of this patent is extended or adjusted under 35 U.S.C. 154(b) by 134 days.

(21) Appl. No.: 16/203,239

(22) Filed: Nov. 28, 2018

(65) Prior Publication Data

US 2020/0167575 A1 May 28, 2020

(51) Int. Cl.
| | | |
|---|---|---|
| G06K 9/00 | (2006.01) | |
| G01C 21/32 | (2006.01) | |
| G06N 20/00 | (2019.01) | |
| H04W 4/44 | (2018.01) | |
| G05D 1/02 | (2020.01) | |

(52) U.S. Cl.
CPC ......... *G06K 9/00798* (2013.01); *G01C 21/32* (2013.01); *G05D 1/0274* (2013.01); *G06N 20/00* (2019.01); *H04W 4/44* (2018.02)

(58) Field of Classification Search
CPC .............................. G06K 9/00798; G01C 21/32
See application file for complete search history.

(56) References Cited

U.S. PATENT DOCUMENTS

| | | |
|---|---|---|
| 6,853,913 B2 | 2/2005 | Cherveny et al. |
| 8,605,947 B2 | 12/2013 | Zhang et al. |
| 9,140,792 B2 | 9/2015 | Zeng |
| 9,174,569 B2 | 11/2015 | Bradai et al. |
| 10,013,610 B2 | 7/2018 | Chen et al. |
| 2017/0109644 A1 | 4/2017 | Nariyambut Murali et al. |
| 2017/0277716 A1* | 9/2017 | Giurgiu .................. G01C 21/32 |
| 2019/0147331 A1* | 5/2019 | Arditi .................... G01C 21/32 706/20 |

FOREIGN PATENT DOCUMENTS

WO 2017120336 A2 7/2017

* cited by examiner

*Primary Examiner* — Tuan H Nguyen
(74) *Attorney, Agent, or Firm* — Ditthavong & Steiner, P.C.

(57) ABSTRACT

A method is provided for prediction of a physical divider on a road. The method comprises retrieving vehicular sensor data, map data, or a combination thereof captured over a predefined period of time for at least one segment of the road. The method further comprises aggregating the respective vehicular sensor data, map data, or the combination thereof for the at least one segment of the road to generate one or more aggregated values. The method further comprises generating output data corresponding to presence of the physical divider in the at least one segment of the road by a machine learning model based on the one or more aggregated values as an input to the machine learning model.

20 Claims, 18 Drawing Sheets

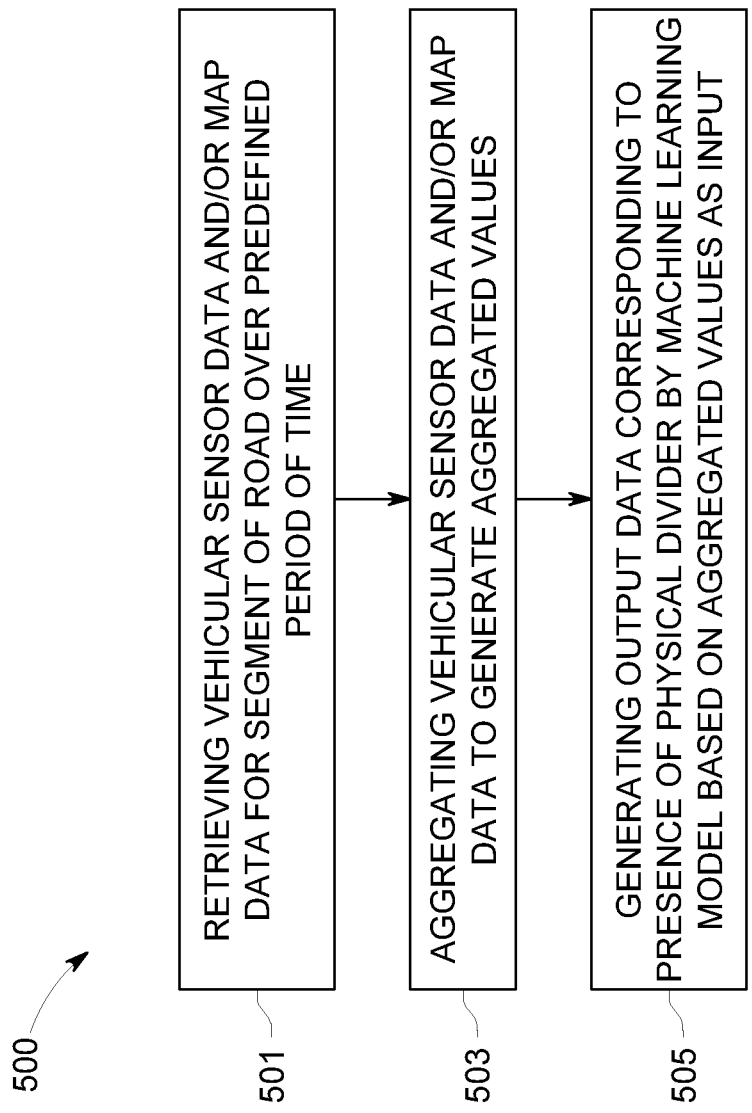

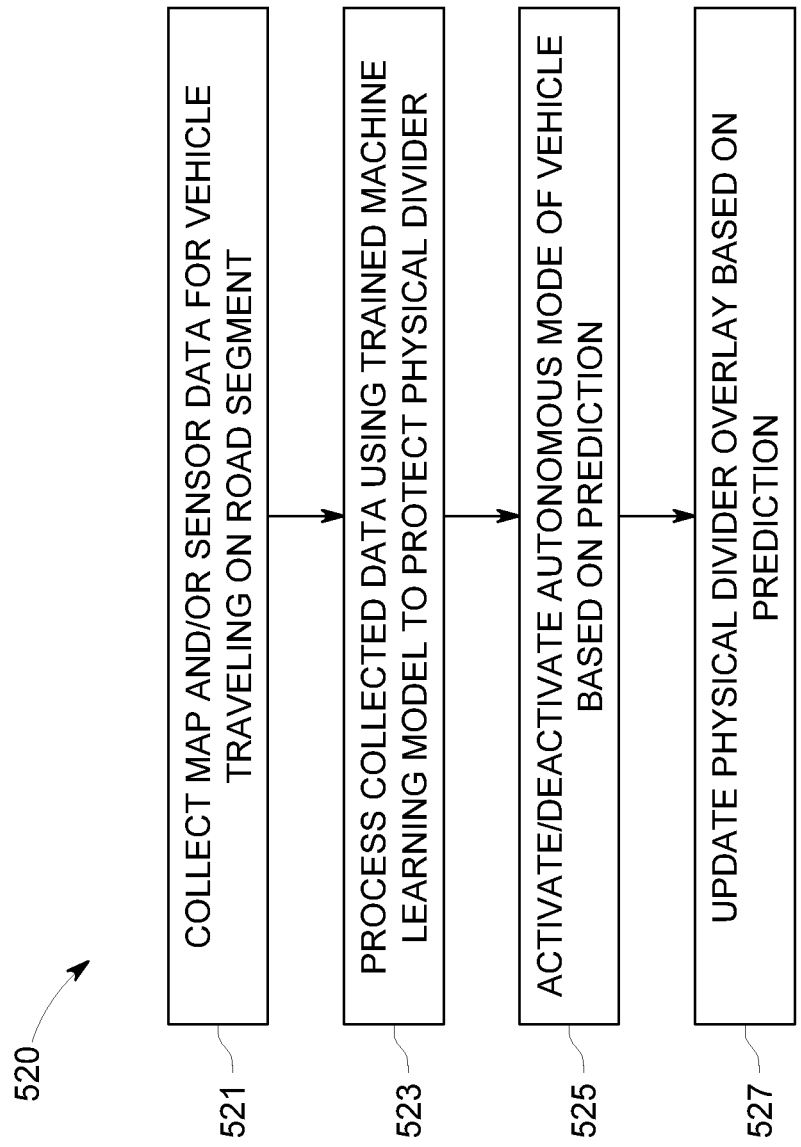

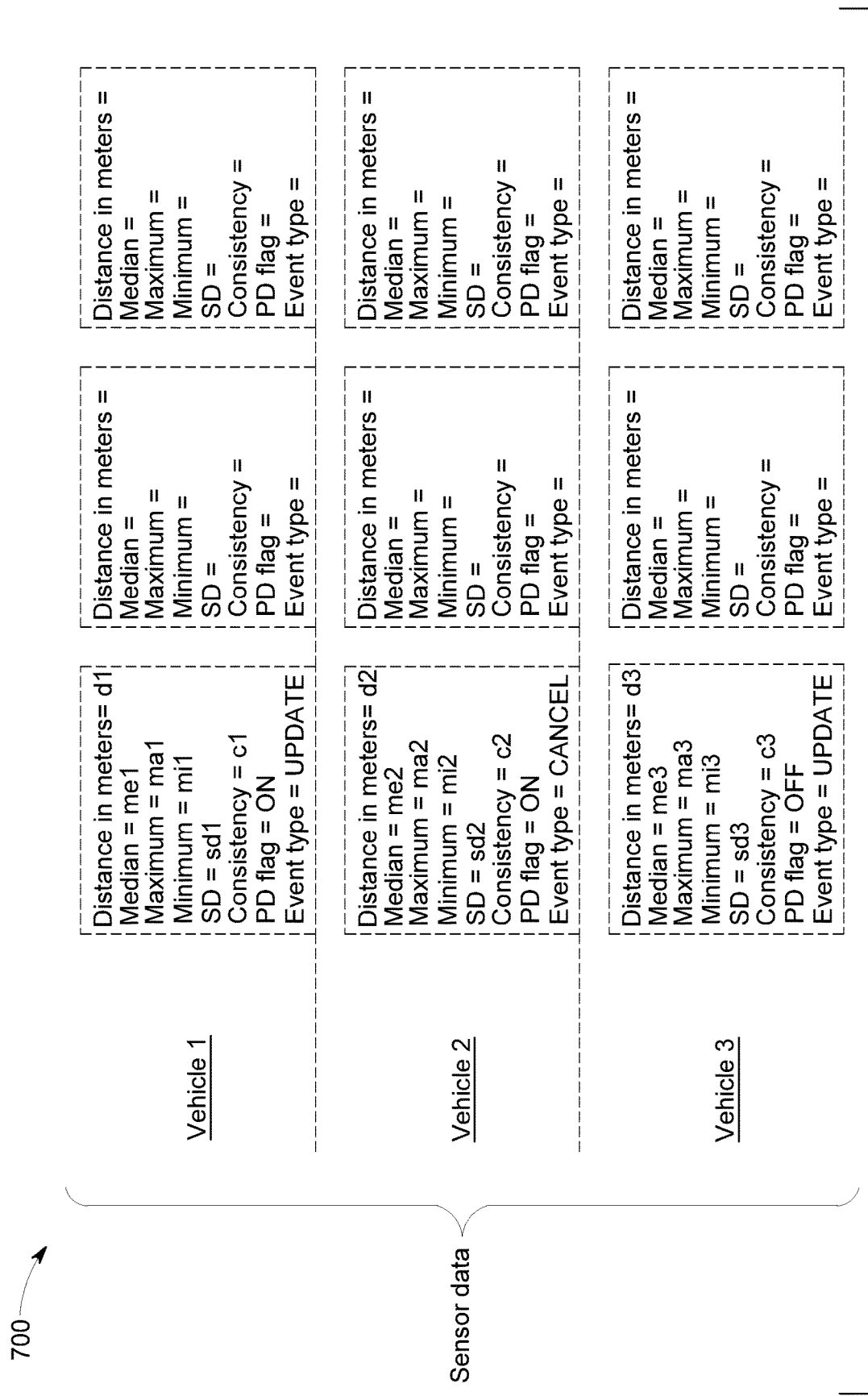

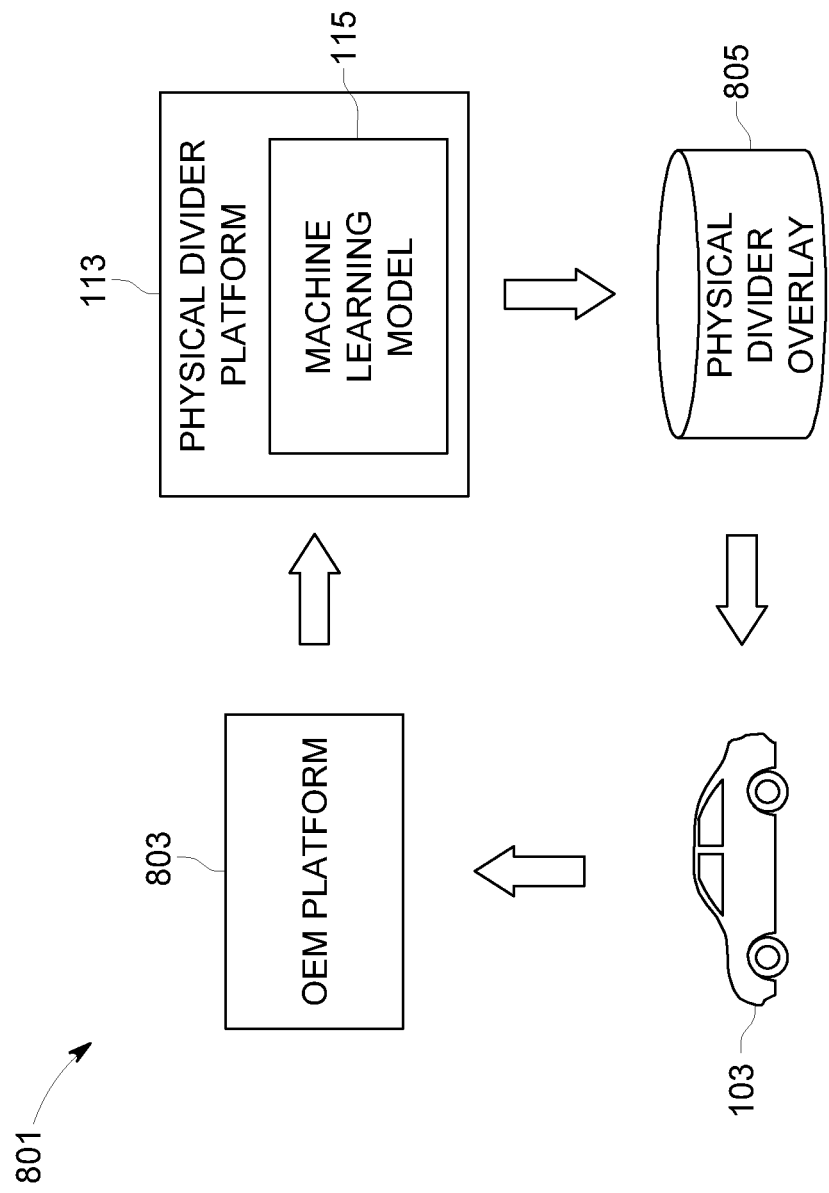

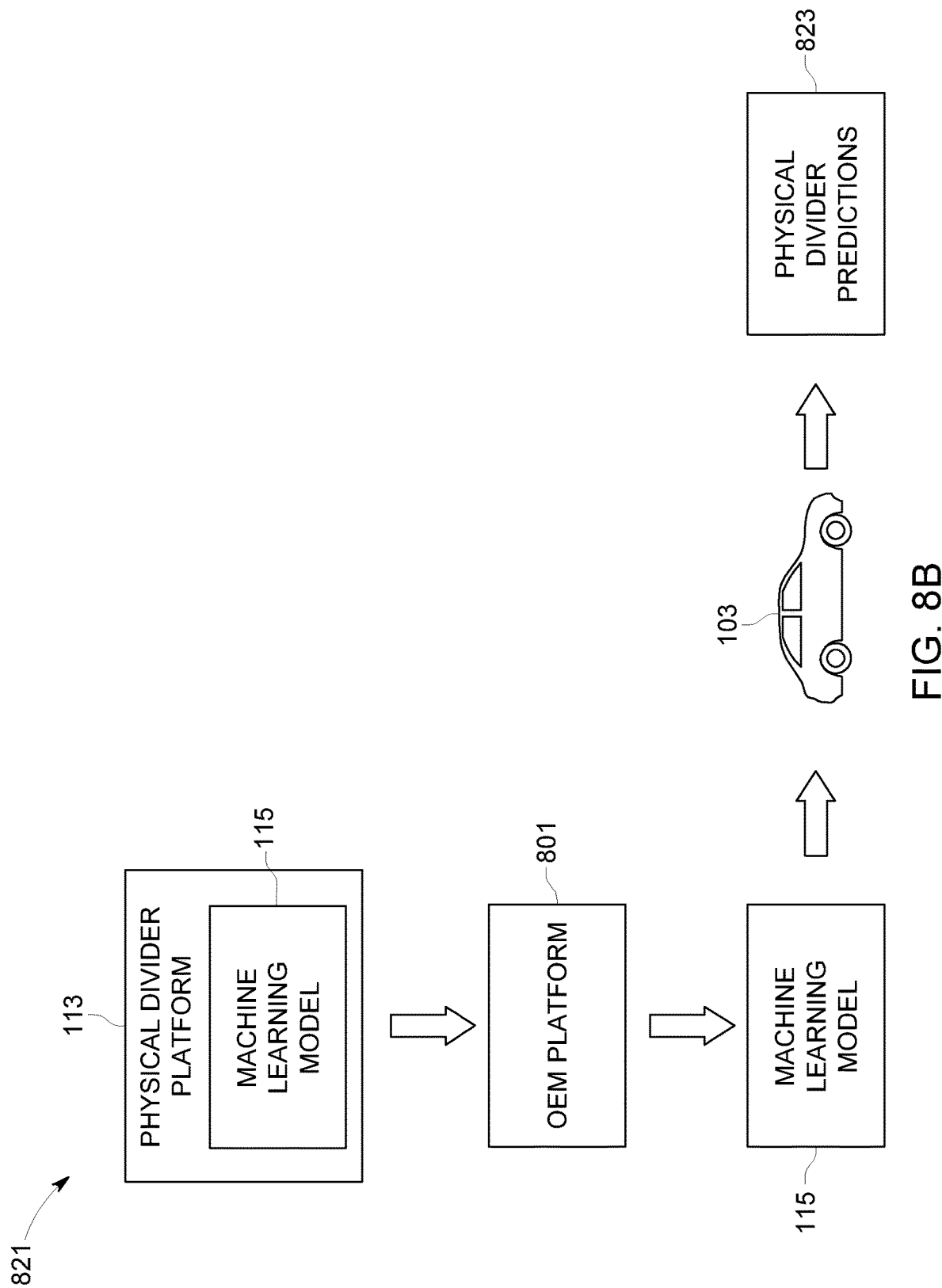

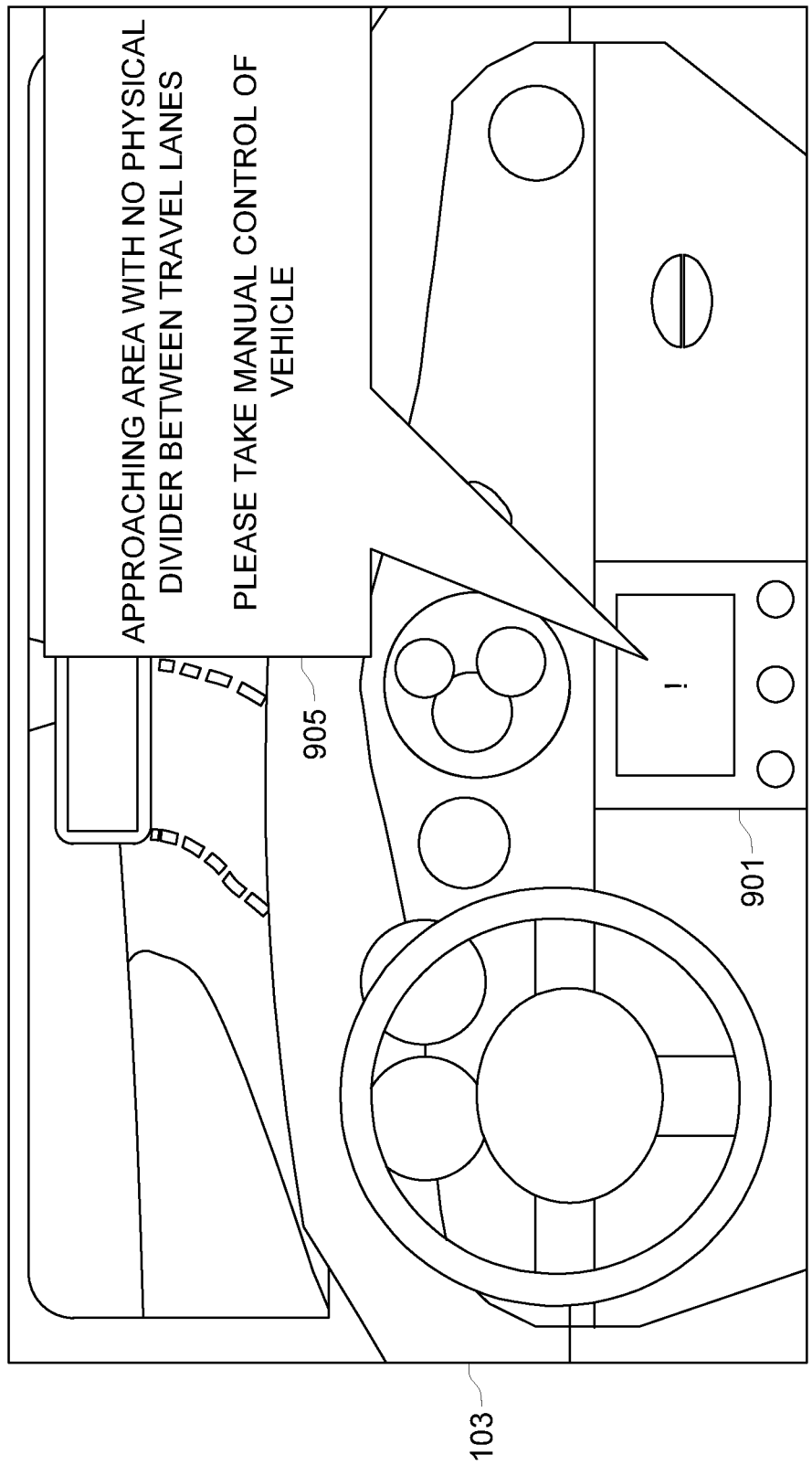

METHOD AND SYSTEM OF A MACHINE LEARNING MODEL FOR DETECTION OF PHYSICAL DIVIDERS

TECHNOLOGICAL FIELD

An example embodiment of the present invention relates to training a machine learning model, and more particularly, to using the trained machine learning model for predicting presence of one or more physical dividers on at least one segment of a road.

BACKGROUND

Providing environmental awareness for vehicle safety, particularly in autonomous driving, has been a primary concern for automobile manufacturers and related service providers. For example, knowing whether physical dividers (e.g., structural separators) exist between travel lanes of a road segment can be an indicator that there is less potential for inter-lane accidents or collisions. Mapping these physical dividers, however, has historically been resource-intensive. Recently, some machine learning models have been developed for predicting the presence of a physical divider. Such machine learning models are trained by passing sets of raw sensor data to a modelling system for which the machine learning model has to be called for each set, which can take a long time and sometimes may even not be feasible. Accordingly, service providers face significant technical challenges to more efficiently detect and map physical dividers on road segments.

Some Example Embodiments

Therefore, there is a need to provide a more efficient approach for training a machine learning model for detection of one or more physical dividers using vehicular sensor data and map data.

According to one embodiment, a computer-implemented method for prediction of a physical divider on a road is provided. The method comprises retrieving vehicular sensor data, map data, or a combination thereof captured over a predefined period of time for at least one segment of the road. The method further comprises aggregating the respective vehicular sensor data, map data, or the combination thereof for the at least one segment of the road to generate one or more aggregated values. The method further comprises generating output data corresponding to presence of the physical divider in the at least one segment of the road by a machine learning model based on the one or more aggregated values as an input to the machine learning model.

According to another embodiment, a system for prediction of a physical divider on a road is provided. The system comprises at least one memory configured to store instructions and at least one processor configured to execute the instructions to retrieve vehicular sensor data, map data, or a combination thereof captured over a predefined period of time for at least one segment of the road. The system is also caused to aggregate the respective vehicular sensor data, map data, or the combination thereof for the at least one segment of the road to generate one or more aggregated values. The system is further caused to generate output data corresponding to presence of the physical divider in the at least one segment of the road by a machine learning model based on the one or more aggregated values as an input to the machine learning model.

According to yet another embodiment, a non-transitory computer-readable storage medium having stored thereon computer-executable instructions which when executed by a computer, cause the computer to execute operations for prediction of a physical divider on a road, the operations comprising retrieving vehicular sensor data, map data, or a combination thereof captured over a predefined period of time for at least one segment of the road. The operations also comprise aggregating the respective vehicular sensor data, map data, or the combination thereof for the at least one segment of the road to generate one or more aggregated values. The operations also comprise generating output data corresponding to presence of the physical divider in the at least one segment of the road by a machine learning model based on the one or more aggregated values as an input to the machine learning model.

According to one or more embodiments, the vehicular sensor data is retrieved from a plurality of in-vehicle sensors installed in multiple vehicles traveling the road or from an original equipment manufacturer (OEM) cloud of the multiple vehicles. The vehicular sensor data comprises continuous vehicular sensor data including physical divider average distance, physical divider maximum distance, physical divider minimum distance, or a combination thereof. The physical divider flag is determined by processing the vehicular sensor data related to a number of positive observations of the physical divider by unique vehicles traveling the segment of the road. The vehicular sensor data further comprises categorical vehicular sensor data including a physical divider measurement event type, a physical divider flag, or a combination thereof. The map data includes a functional class, a speed limit, a presence of a road sign, a bi-directionality, a number of lanes, a speed category, a distance to a point of interest, or a combination thereof. The retrieved vehicular sensor data is uniformed during aggregation thereof. The one or more aggregated values generated from the continuous vehicular sensor data includes at least one of a standard deviation and a mean of each of physical divider average distance, physical divider maximum distance, physical divider minimum distance, or a combination thereof. Further, the one or more aggregated values generated from the categorical vehicular sensor data includes selected categorical values, using a voting algorithm, for each of the physical divider measurement event type, the physical divider flag, or a combination thereof. The one or more aggregated values are collected over an extended period of time for use in training of the machine learning model for prediction of presence of the physical divider. Herein, the predefined period of time is smaller than the extended period of time. The predefined period of time may be approximately 1 day or any suitable period of time as may be required for accurate prediction of the physical divider, and the extended period of time may be approximately 3 months or any other suitable period of time that is longer than the predefined period of time.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 5A is a flowchart of a method for prediction of a physical divider on a road, according to one embodiment;

FIG. 5B is a flowchart of a process for controlling an autonomous vehicle using prediction of the physical divider on the road, according to one embodiment;

FIG. 7A and FIG. 7B are depictions of a tabular representation of aggregated data for an exemplary stretch of road, according to one embodiment;

FIGS. 8A and 8B are diagrams of example architectures for providing machine learning of physical dividers, according to one embodiment;

FIGS. 9A and 9B are diagrams of example user interfaces based on physical dividers predicted by machine learning, according to on embodiment;

DESCRIPTION OF SOME EMBODIMENTS

Examples of a method, system, and computer program for training a machine learning model for detection of a physical divider are disclosed herein. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
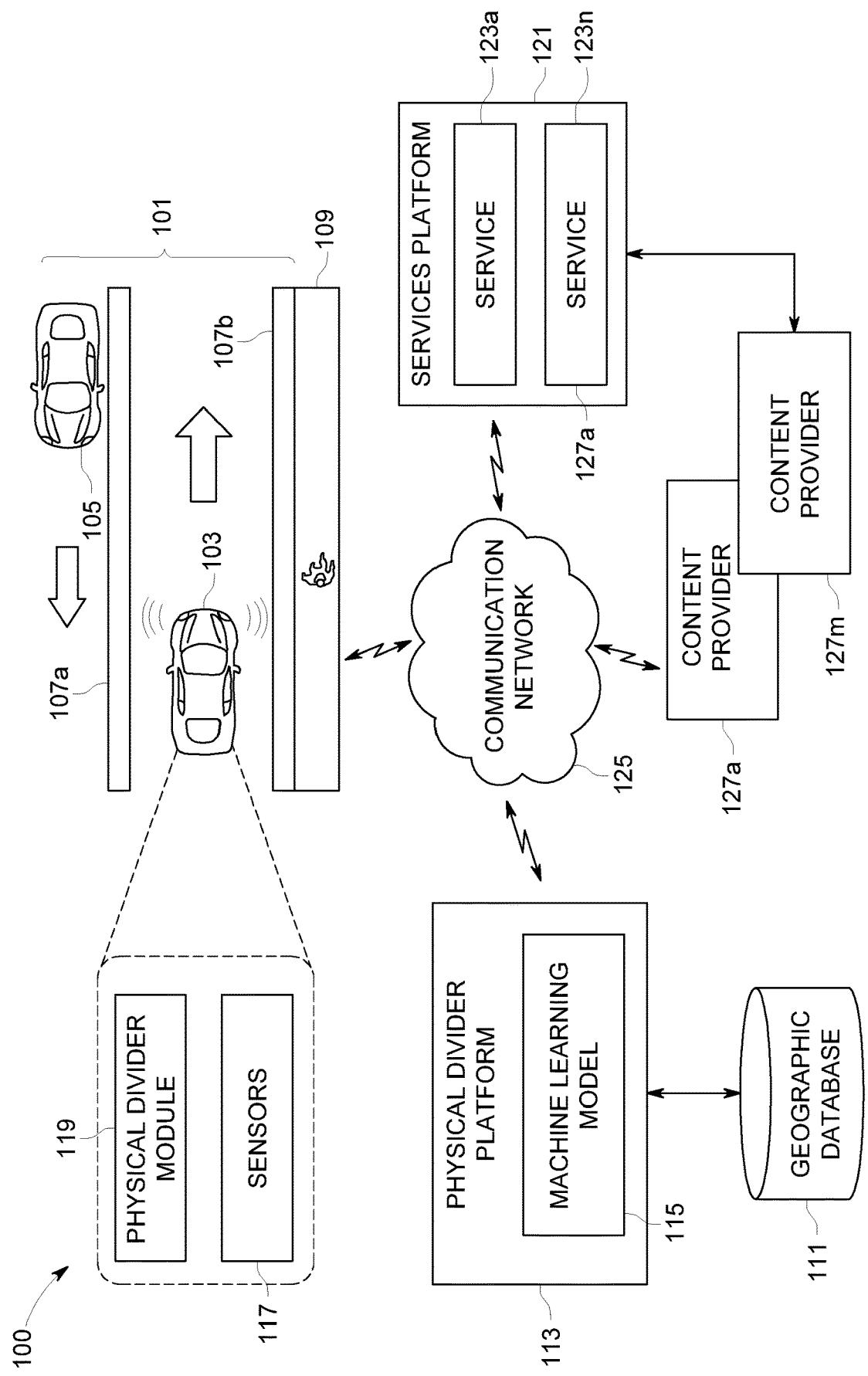
FIG. 1 is a diagram of a system capable of providing prediction of physical dividers, according to one embodiment.

FIG. 1 is a diagram of a system 100 capable of providing machine learning model for predicting physical dividers on a road, according to one embodiment. Having knowledge of whether physical dividers are present or absent on a road segment can provide important situational awareness and improved safety to vehicles, particularly autonomous vehicles that operate with reduced or no human driver input. In other words, an understanding of where other vehicles and traffic objects may potentially be and what they might do is important for an autonomous vehicle to safely plan a route. For example, as shown in FIG. 1, a road 101 may support bi-directional traffic with a first vehicle 103 traveling in one direction and a second vehicle 105 traveling in the opposite direction. In this example, a first physical divider 107a is present between the vehicle travel lanes of the road 101, and a second physical divider 107b is present between the one of the vehicle travel lanes and a pedestrian lane 109 adjacent to the road 101 (also collectively referred to as physical dividers 107). The presence of the physical dividers 107 can improve safety by reducing the probability of oncoming traffic collisions, or collisions with pedestrians or other non-vehicular traffic.

Figure 2:
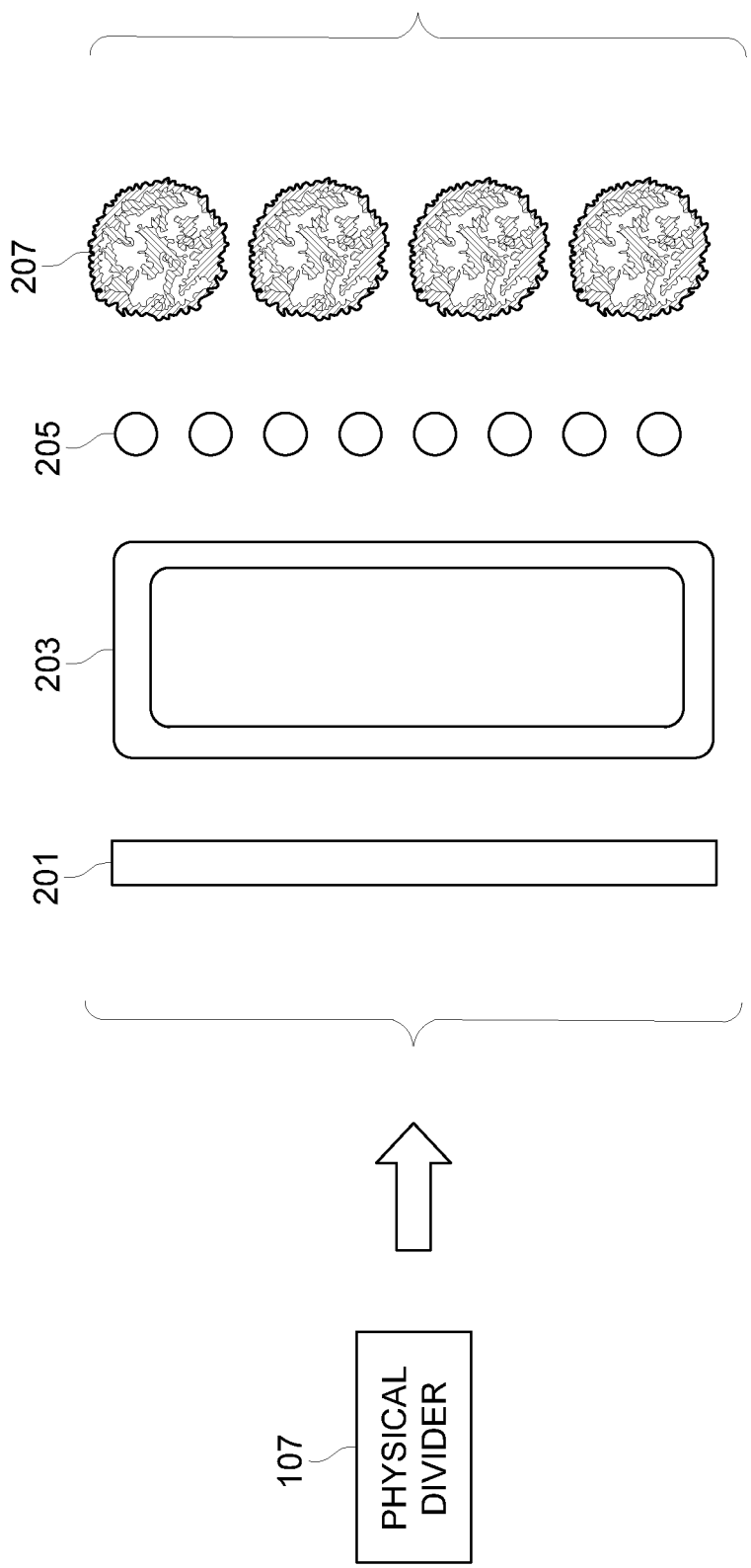
FIG. 2 is a diagram illustrating examples of physical dividers, according to one embodiment.

In one embodiment, a physical divider 107 is a structural separator that is a fixed roadside or median entity that prevents vehicles and/or pedestrians traveling in one lane from crossing into or accessing other lanes of the road (and/or from crossing between different traffic flow directions). The physical divider 107 can be, for instance, a physical barrier, or provide enough clearance between different lanes or traffic flow directions so that potential crossover traffic is minimized or prevented. FIG. 2 is a diagram illustrating examples of physical dividers. As shown, a physical divider can include, but is not limited to, (1) a solid wall 201 (e.g., a concrete barrier), (2) a median 203 that is sufficiently wide to separate reduce potential crossover traffic to a threshold probability, (3) a row of columns 205, (4) a row of trees 207, etc. It is noted that, in one embodiment, a physical divider 107 can be made of any type material or construction provided that it reduces, minimizes, or prevents potential crossover between travel lanes or traffic flow directions.

Because of the diversity of physical dividers 107 and the variability of their installation along roadways, mapping the presence or absence of physical dividers 107 historically has been a resource-intensive effort, typically employing data collection vehicles to travel the roads for human observers to manually annotate physical dividers in a map data (e.g., a geographic database 111). As a result, map providers have traditionally been only able to map a small percentage of the physical dividers 107. Moreover, such mapping is of static nature and may not reflect any dynamic change in the positioning or presence of the physical dividers. Some machine learning models have been developed for predicting the presence of a physical divider. However, such machine learning models are trained by passing sets of raw sensor data to a modelling system for which the machine learning model have to be called for each set, which can take a long time and sometime may even not be feasible. Therefore, providing a more efficient approach for training a machine learning model for detection of the physical dividers 107 using vehicular sensor data (sometimes, simply referred to as "sensor data") and map data presents a significant technical problem.

To address this problem, a system 100 of the present disclosure (as illustrated in FIG. 1) introduces a capability to use machine learning model (e.g., a supervised learning algorithm) to process vehicular sensor data and/or map data to determine the probability of a physical divider existing on a segment of road. In one embodiment, a physical divider platform 113 can train a machine learning model 115 (e.g., Random Forest, Decision Tree, Neural Net, or equivalent) to predict physical dividers 107 on a road segment of interest, based on map data associated with the segment of interest, vehicular sensor data collected from vehicles (e.g., the vehicle 103 equipped with an array of sensors 117), an OEM cloud for the vehicles, or a combination thereof. In one embodiment, at least one vehicle (e.g., vehicle 103) can include a physical divider module 119 for performing one or more functions associated with machine learning of physical dividers alone or in combination with the physical divider platform 113. In one or more embodiments, the components and processes of the system 100 of the present disclosure can also be implemented in a stand-alone apparatus (similar to the system 100) without any limitations.

In one embodiment, the physical divider platform 113 and/or the physical divider module 119 can then use the trained machine learning model 115 to calculate the probability of a physical divider 107 (i.e., a structural separator) being on the road segment of interest based on the map data and/or vehicle sensor information associated with the segment of interest. If the calculated probability is above a threshold value, then the physical divider platform 113 can output data indicating a predicted presence of the physical divider 107 on the segment. If the calculated probability is below the threshold value, then the physical divider platform 113 can output data indicating a predicted absence of the physical divider 107 on the segment. Thus, example embodiments illustrated herein, provide for a robust system that minimizes the number of times the machine learning model 115 is called for predicting presence of the physical divider 107.

In one embodiment, the goal of detecting or predicting a physical divider 107 is to determine the probability of other related characteristics such as, but not limited to: (1) probability of oncoming or opposite traffic on the segment of interest (OPPO) (e.g., if there is no physical divider 107 between opposite traffic flows on the segment, the probability of oncoming traffic or a collision with oncoming traffic can be higher); and (2) probability of the presence of vulnerable road users (VRU) (e.g., if there is no physical divider 107 between vehicular and non-vehicular traffic, then there is a greater possibility of a possible collection with VRU's, e.g., pedestrians, bicyclists, etc.). In one embodiment, the physical divider platform 113 can predict the other characteristics that are related to or associated with the presence/absence of a physical divider 107 directly with the machine learning model 115 (e.g., if the machine learning model 115 has been trained accordingly).

In addition or alternatively, the physical divider platform 113 can use a rule-based approach applied on the predicted presence/absence of a physical divider 107 to predict the other characteristics. For example, if there is a no physical divider 107 predicted on the segment and the segment supports bi-directional traffic (e.g., as determined from map data stored in the geographic database 111), then the physical divider platform 113 can also predict that OPPO and VRU probabilities are high. It is noted that this rule is provided by way of illustration and not as a limitation. It is contemplated that the physical divider platform 113 can use any equivalent process or means to determine OPPO, VRU, and/or any other related characteristics from a predicted presence/absence of a physical divider 107 on a segment of interest.

Figure 3:
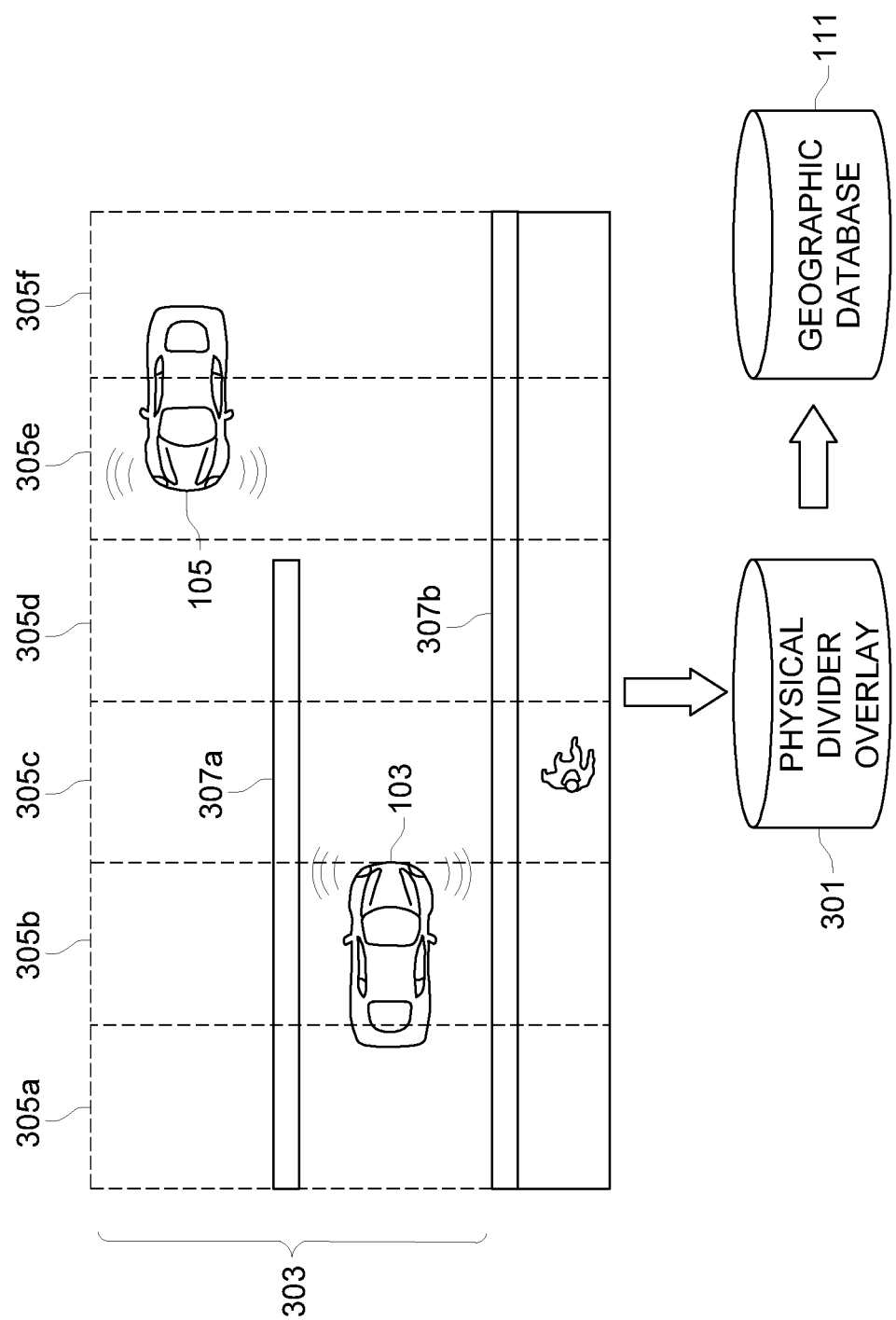
FIG. 3 is a diagram illustrating a process for creating a physical divider overlay for segments of a road, according to one embodiment.

In one embodiment, the physical divider platform 113 segments each of road represented in a map database (e.g., the geographic database 111) into segments of a predetermined length (e.g., 5-meter segments; however, any other segment size may be supported by embodiments of the invention described herein). Then, the physical divider platform 113 can make physical divider predictions for each segment of the road. FIG. 3 is a diagram illustrating an example process for creating a physical divider overlay 301 for segments of a road 303, according to one embodiment. In one embodiment, the physical divider overlay 301 is a data structure that can be associated with the geographic database 111. The physical divider overlay 301 stores, for instance, parametric representations of predicted physical dividers 107, OPPO, VRU, and/or other related attributes in association with corresponding segments of the road 303.

As shown, the physical divider platform 113 segments the road 303 into segments 305a-305f (also collectively referred to as segments 305). The length of each segment provides for a corresponding level of granularity of the detected physical dividers. For example, a default length of the segments 305 can be 5-meters so that each segment 305 represents a 5-meter long portion of the road 303. In one embodiment, shorter segment lengths can be used if a higher resolution of detection of the physical divider 307a-307b is desired, and longer segment lengths can be used to reduce memory storage requirements. It may be appreciated that the last segment may be less than the initially predefined fixed length. The physical divider platform 113 can then collect map data and vehicular sensor data from vehicles (e.g., vehicles 103 and 105) as the vehicles traverse each segment 305a-305f of the road 303.

Figure 4:
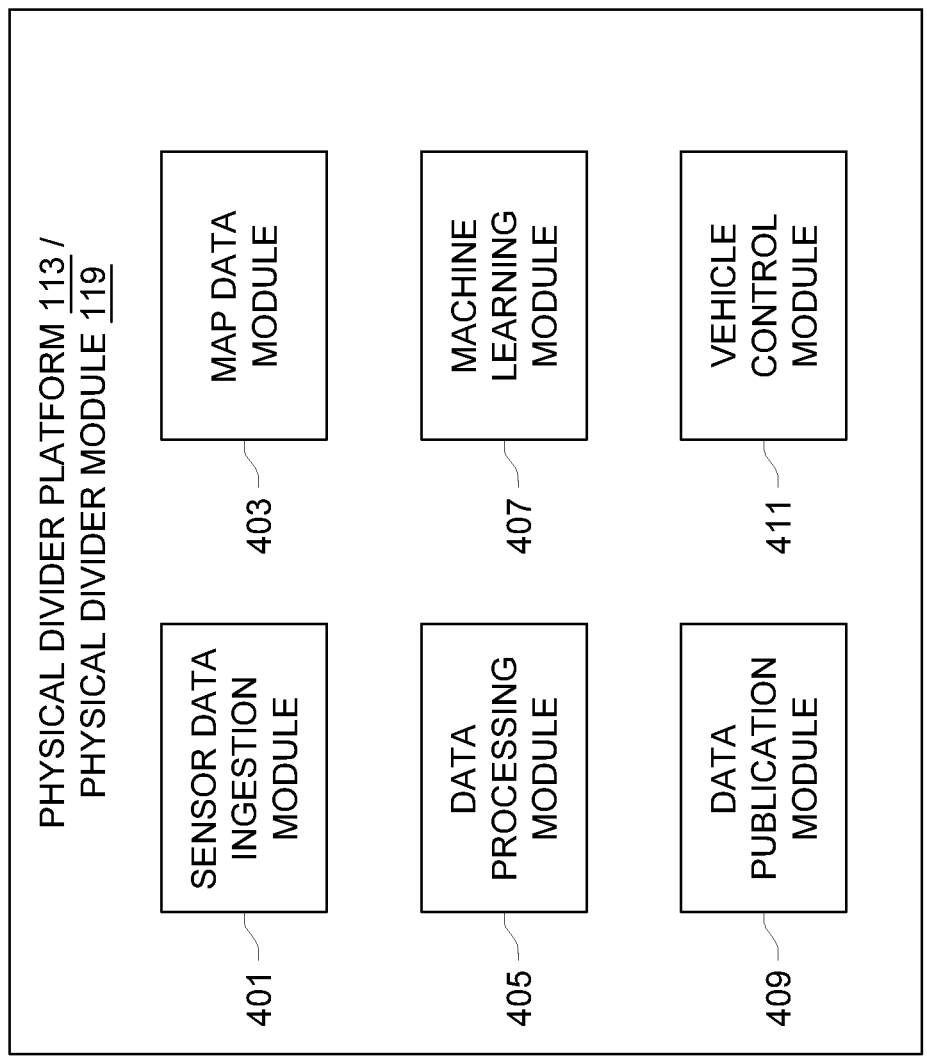
FIG. 4 is a diagram of the components of a physical divider platform, according to one embodiment.

FIG. 4 is a diagram of the components of a physical divider platform 113 and/or physical divider module 119, according to one embodiment. By way of example, the physical divider platform 113 and/or physical divider module 119 includes one or more components for providing machine learning of physical dividers according to the various embodiments described herein. It is contemplated that the functions of these components may be combined or performed by other components of equivalent functionality. In this embodiment, the physical divider platform 113 and/or physical divider module 119 include a sensor data ingestion module 401, a map data module 403, a data processing module 405, a machine learning module 407, a data publication module 409, and a vehicle control module 411. The above presented modules and components of the physical divider platform 113 and/or physical divider module 119 can be implemented in hardware, firmware, software, or a combination thereof. Though depicted as separate entities in FIG. 1, it is contemplated that the physical divider platform 113 and/or physical divider module 119 may be implemented as a module of any of the components of the system 100; e.g., a component of the vehicle 103, services platform 121, services 123a-123n (also collectively referred to as services 123), etc. In another embodiment, one or more of the modules 401-411 may be implemented as a cloud based service, local service, native application, or a combination thereof. The functions of the physical divider platform 113, physical divider module 119, and modules 401-411 are discussed with respect to FIGS. 5A-9B below.

Figure 12:
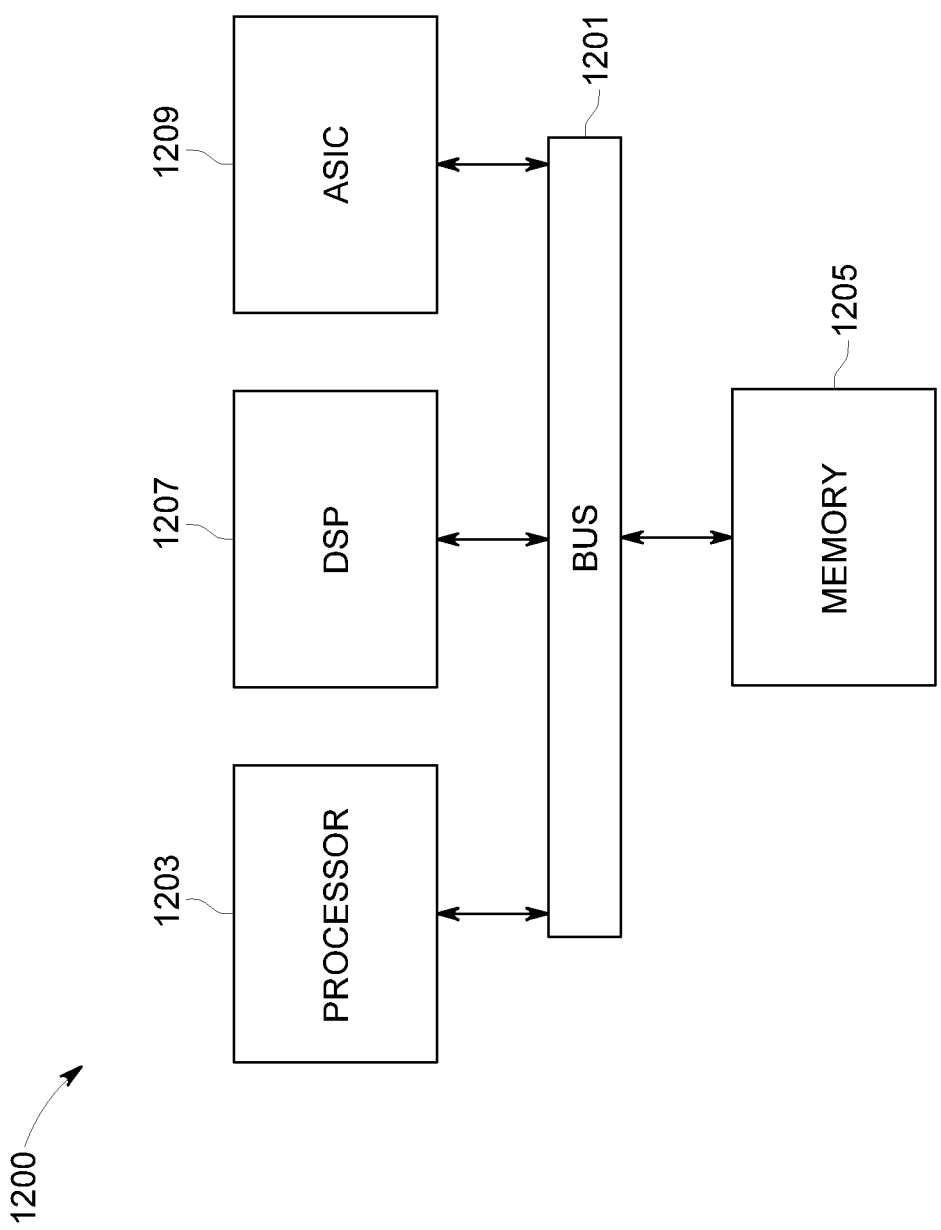
FIG. 12 is a diagram of a chip set that can be used to implement an embodiment.

FIG. 5A is a flowchart of a method 500 for prediction of a physical divider on a road using a machine learning model (e.g., machine learning model 115), according to one embodiment. In various embodiments, the physical divider platform 113, physical divider module 119, and/or any of the modules 401-411 may perform one or more portions of the method 500 and may be implemented in, for instance, a chip set including a processor and a memory as shown in FIG. 12. As such, physical divider platform 113, physical divider module 119, and/or any of the modules 401-411 can provide means for accomplishing various parts of the method 500, as well as means for accomplishing embodiments of other processes described herein in conjunction with other components of the system 100. Although the method 500 is illustrated and described as a sequence of steps, its contemplated that various embodiments of the method 500 may be performed in any order or a combination and need not include all of the illustrated steps. The method 500, for instance, describes the process for collecting map and/or vehicular sensor data to train the machine learning model 115 to predict physical dividers for a given road segment.

In step 501, the method 500 includes retrieving vehicular sensor data, map data, or a combination thereof captured over a period of time for at least one segment of a road. Herein, the physical divider platform 113 can use any combination of the captured map and/or vehicular sensor data to create a training data set for training the machine learning model 115. In one embodiment, the composition of the training data set can be based on a target level of prediction accuracy. For example, retrieving both map data and sensor data can potentially provide for increased predictive accuracy over either type of data individually. However, when the target predictive accuracy can be achieved by using map data or sensor data alone, the physical divider platform 113 can reduce the resource-burden associated with having to collect both datasets. In an exemplary embodiment, the predefined period of time is approximately one day; however, it may be contemplated that the predefined period of time may be suitably adjusted depending on the requirements of the machine learning model 115 for the training data.

In one embodiment, the sensor data ingestion module 401 can be used to retrieve vehicular sensor data, and the map data module 403 can be used to retrieve map data for given segment of a road. As noted above, the physical divider platform 113 can segment a road into discrete segments of a predetermined length (e.g., 5-meters) to facilitate processing. In this case, for each segment of road, the sensor data ingestion module 401 extracts raw data collected from vehicle sensors (e.g., camera, radar, LiDAR, etc.) of vehicles traveling on the segment of interest. In some example embodiments, the raw data may be reterived directly from the original equipment manufacturer (OEM) sensors or from an OEM cloud. For example, the raw sensor data can include, but is not limited, to a cross-sensor consistency distribution (e.g., minimum, maximum, mean, standard deviation, or other statistical parameter of the distribution can be used), a physical divider distance distribution (e.g., also minimum, maximum, mean, standard deviation, or other statistical parameter of the distribution can be used), a height of the physical divider 107, a vehicle speed, a physical divider type (e.g., see examples of FIG. 3), a physical divider sample point count, or a combination thereof. It is contemplated that any sensed parameter of the vehicle, the physical divider 107, or the road segment (e.g., weather, time of day, visibility, etc.) can be collected as raw sensor data for processing by the sensor data ingestion module 401.

Figure 6:
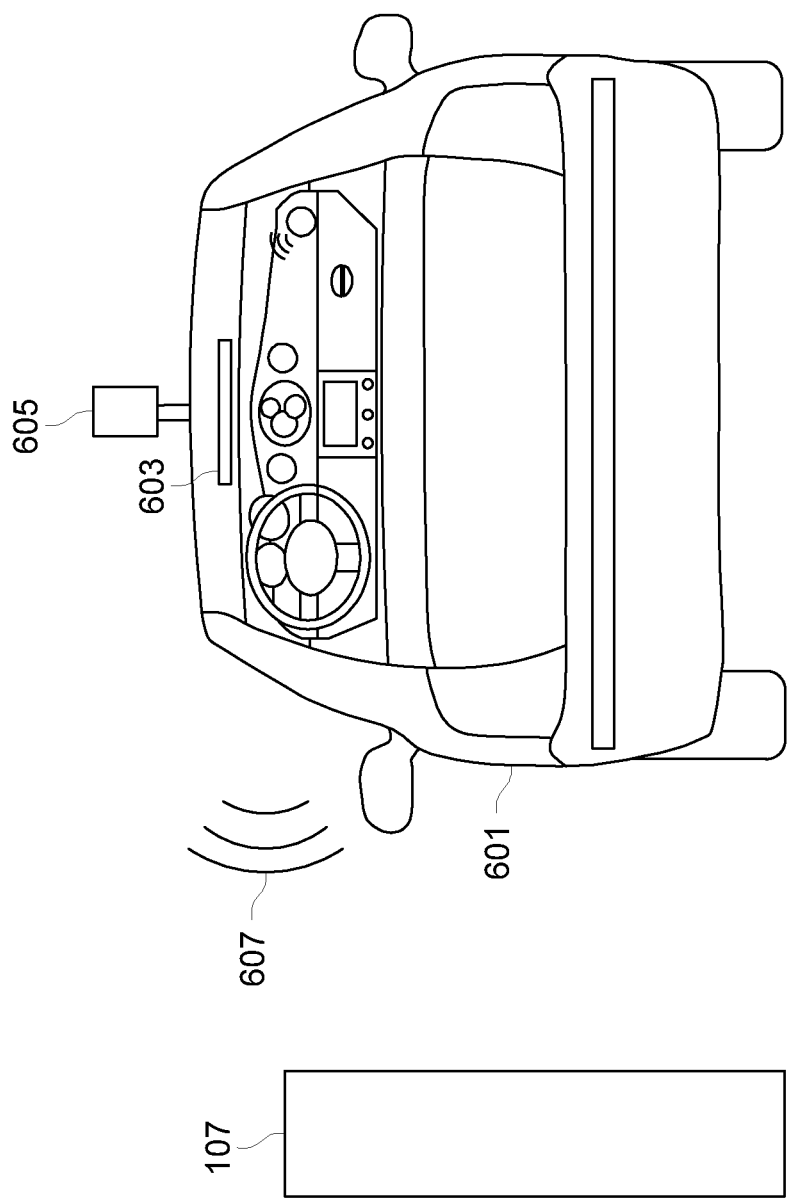
FIG. 6 is a diagram illustrating an example of a vehicle equipped with sensors to support machine learning for use in prediction of physical dividers, according to one embodiment.

FIG. 6 is a diagram illustrating an example of a vehicle 601 equipped with sensors to capture the vehicular sensor data support in order to train the machine learning model for prediction of physical dividers, according to one embodiment. As shown, a vehicle 601 is equipped with a camera sensor 603, a LiDAR sensor 605, and a radar sensor 607. Each of these sensors 603-607 are capable of sensing the presence of a physical divider 107 individually. However, each sensor 603-607 has a respective drawback. For example, LiDAR data or camera data of the physical divider 107 can be obscured if there an obstruction (e.g., another vehicle) between the vehicle 601 and the physical divider 107. Similarly, radar signals may pass through the physical divider 107 when it is made or porous material or other material that reflects radar signals poorly, have a low height, etc. These weaknesses can potentially lead to less reliable or less accurate detection of physical dividers 107.

To address the individual technical weaknesses of the sensors 603-607, the sensor data ingestion module 401, for instance, can perform in-vehicle sensor fusion of the physical divider 107 or structural separator. In other words, the sensor data ingestion module 401 can use multiple different sensors 603-607 to determine a consistency of detection of the physical divider 107 among the different sensors 603-607. For example, with respect to cross-sensor consistency, the sensor data may be collected from at least two sensors of the vehicle. Then the various sensed characteristics of the detected physical divider 107 can be compared (e.g., location from the vehicle 601, detected height of the physical divider 107, etc.) for consistency (e.g., by calculating a percent difference or equivalent). In addition, because each of the sensors are capable of sampling multiple times per second or faster, a distribution of the cross-sensor consistency can be determined from the sampling set. In one embodiment, the cross-sensor consistency distribution can be one parameter retrieved by the sensor data ingestion module 401 as feature indicating a consistency of detecting the physical divider 107 between each of at least two of the sensors 603-607.

In one embodiment, the sensor data ingestion module 401 can also pre-process the collected raw sensor data to provide the vehicular sensor data for training of the machine learning model 115 (as discussed later). In the present embodiments, the vehicular sensor data includes continuous vehicular sensor data including physical divider average distance, physical divider maximum distance, physical divider minimum distance, or a combination thereof. Further, the vehicular sensor data comprises categorical vehicular sensor data including a physical divider measurement event type, a physical divider flag, or a combination thereof.

In one embodiment, the vehicular sensor data is retrieved from a plurality of in-vehicle sensors installed in multiple vehicles traveling the road. The sensor data ingestion module 401 can use such sensor data from multiple vehicles traveling on the same road segment to determine additional attributes or features for machine learning. For example, the sensor data ingestion module 401 can process the sensor data from a plurality of vehicles traveling the segment of the road to determine or calculate a derivative feature. A derivative feature refers to any feature or attribute that can be calculated or processed from the raw data from multiple vehicles (e.g., not directly sensed by a sensor 603-607). For example, the derivative feature can include, but is not limited to, the number of positive observations of the physical divider 107 by unique vehicles traveling the road segment. In one embodiment, this number of positive observations can be normalized by the total number of drives or vehicles that passed the given segment. Thereby, the physical divider flag can be determined by processing the vehicular sensor data related to a number of positive observations of the physical divider 107 by unique vehicles traveling the segment of the road.

In an embodiment where the map data is used alone or in combination with the sensor data, the map data module 403 can retrieve requested map data for a road segment of interest by performing a location-based query of the geographic database 111 or equivalent. By way of example, the map data can include any attribute of the road segment or corresponding map location stored in the geographic database 111. The retrieved map data can include, but is not limited to, a functional class, a speed limit, a presence of a road sign (e.g., school zone sign), a bi-directionality of the road, a number of lanes, a speed category, a distance to a nearby point of interest, or a combination thereof. The map data can also include the presence of non-vehicular travel lanes on the road segment (e.g., sidewalks, bicycle paths, etc.).

In one embodiment, the sensor data ingestion module 401 can retrieve sensor data directly from vehicles with connected communications capabilities (e.g., cellular or other wireless communications equipped vehicles) or from an Original Equipment Manufacturer (OEM) provider (e.g., automobile manufacturer) operating a OEM platform (e.g., a services platform 123) that collects sensor data from vehicles manufactured by or otherwise associated with the OEM. The retrieval of the sensor data and/or the map data can occur in real-time or near real-time, continuously, periodically, according to a schedule, on demand, etc.

In one embodiment, the sensor data can be provided as location trace data in which each sensor data sampling point is associated with location coordinates of the collection vehicle. The location coordinates can be determined from location sensors (e.g., GPS/satellite-based location sensors or equivalent) and recorded with the sensor data. In this case, the sensor data ingestion module 401 can perform a map matching (e.g., using any map matching technique known in the art) of the location data of each sensor data sampling point to identify which road segment the sensor data sampling point belongs. In other words, each location trace is associated with segments of map road links and transformed into sensor data observations for a particular segment of the road link. For example, the data ingestion module 401 can use a path-based map matching algorithm by calculating the collection vehicle's direction of travel from the time stamp and GPS points present in the retrieved sensor data.

Figure 5C:
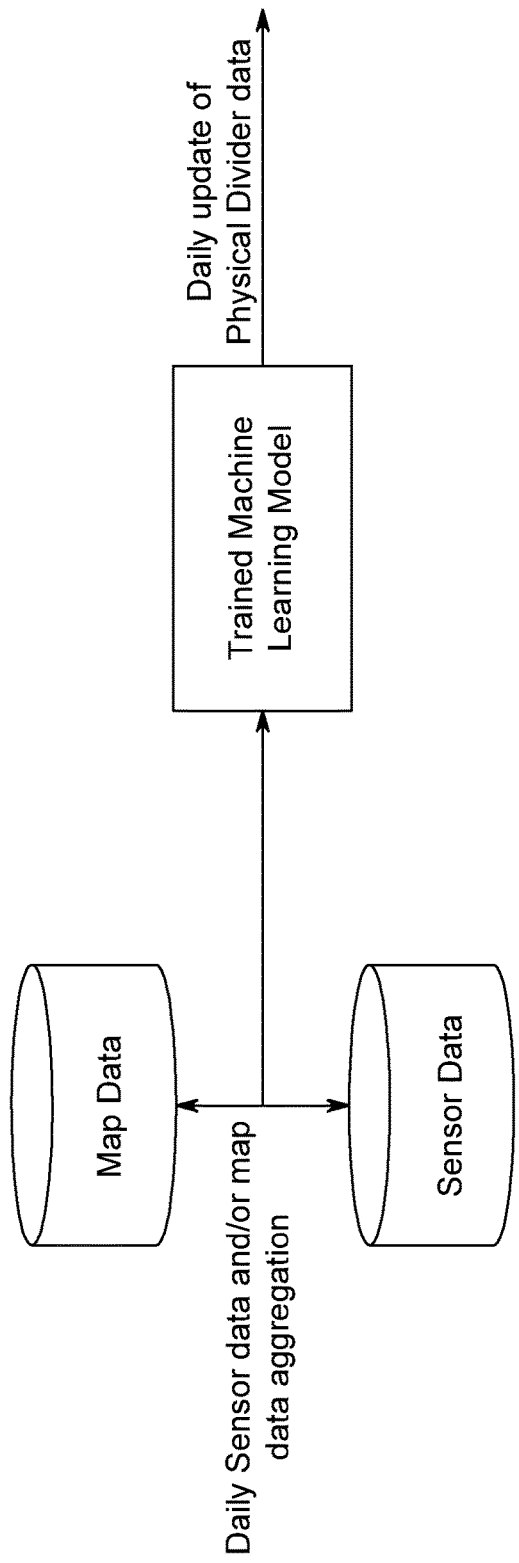
FIG. 5C is a schematic for exemplary daily updation of physical dividers data in a map, according to one embodiment.

In step 503, the method 500 includes aggregating the respective vehicular sensor data, map data, or a combination thereof for the at least one segment of the road to generate one or more aggregated values. That is, after retrieval of the map data, vehicular sensor data, and/or derivative feature or a combination thereof for a given segment of the road for the predefined period of time is aggregated. In the present embodiments, the data is aggregated in the data processing module 405. As discussed, the predefined period of time is approximately 1 day. Thus, the system 100 can have daily update of the map for physical dividers by the machine learning model 115 (as illustrated in FIG. 5C).

For generating one or more aggregated values, the method 500 includes determining at least one of a standard deviation and a mean of each of physical divider average distance, physical divider maximum distance, physical divider minimum distance, or a combination thereof; and generating the one or more aggregated values based on the determined at least one of the standard deviation and the mean of each of physical divider average distance, physical divider maximum distance, physical divider minimum distance, or a combination thereof. Additionally, the method 500 includes selecting categorical values, using a voting algorithm, for each of the physical divider measurement event type, the physical divider flag, or a combination thereof; and generating the one or more aggregated values based on the selected categorical values for each of the physical divider measurement event type, the physical divider flag, or a combination thereof.

In one embodiment, the method 500 includes uniforming the vehicular sensor data retrieved from the plurality of in-vehicle sensors (such as, the sensors 603-607) while aggregation thereof. The vehicular sensor data retrieved from the plurality of in-vehicle sensors is uniformed in the data processing module 405. For instance, in one example, the physical divider average distance (which is measured in meters) is rounded to 2 decimal places. Similarly, the physical divider maximum distance and the physical divider minimum distance (which are also measured in meters) are rounded to 2 decimal places. It may be understood that this is being done so as to enable using of vehicular sensor data from different OEM vehicles that may have driven by the segment of the road, collecting the data.

Figure 5D:
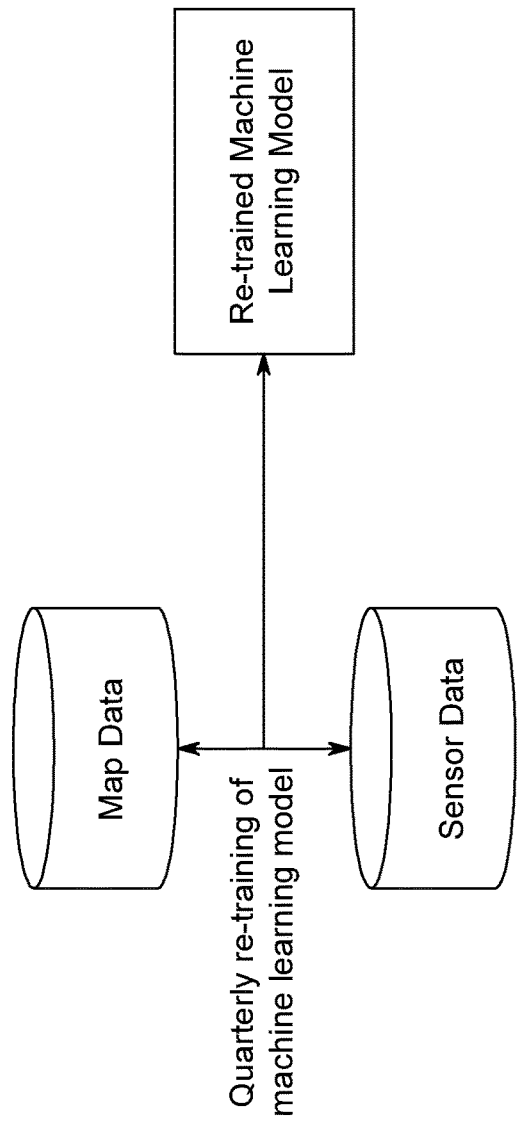
FIG. 5D is a schematic for exemplary quarterly re-training of machine learning model, according to one embodiment.

In one or more embodiments, the one or more aggregated values are collected over an extended period of time for use in training of the machine learning model 115. In the present embodiments, the predefined period of time may be smaller than the extended period of time. In an exemplary embodiment, the extended period of time is approximately 3 months. This may be done, since the system 100 is configured to only consider the last 3 months of data, and any old data that is no longer representative of the road network or recent vehicle observations are dropped. Therefore, the machine learning model 115 may be re-trained quarterly (i.e., after every 3 months) so that the most important features for the machine learning model, i.e., the map features are generally always updated (as illustrated in FIG. 5D).

Figure 7B:
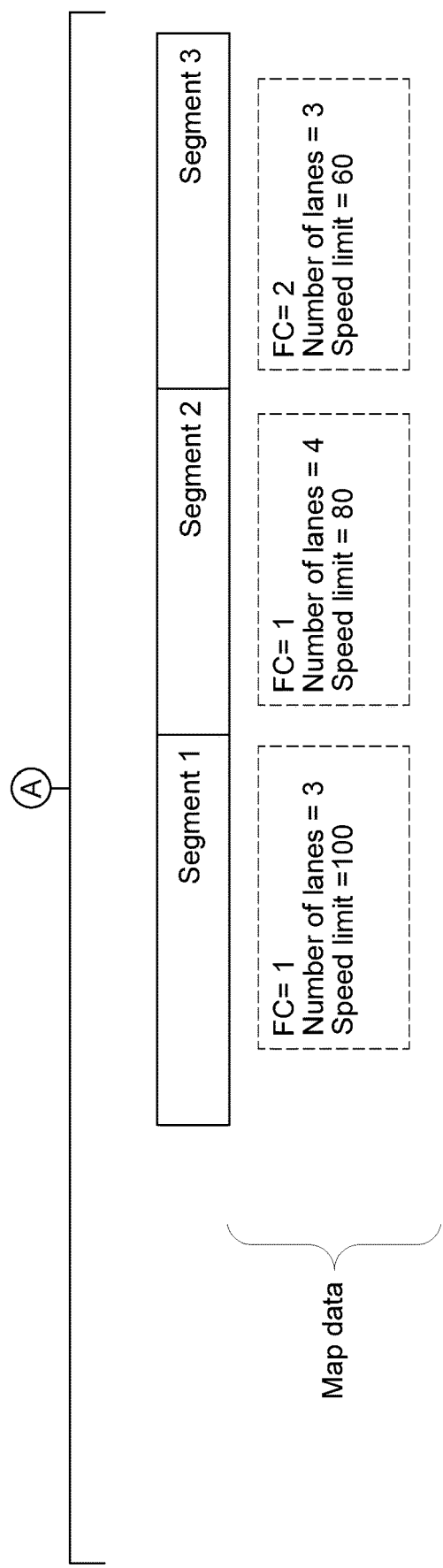

FIG. 7A and FIG. 7B depict tabular representations of aggregated data for a stretch of road with three (3) number of segments (i.e., segment 1, segment 2, and segment 3). FIG. 7A depicts the sensor data aggregated for the stretch of the road with three segments. FIG. 7B depicts the map data aggregated for the stretch of the road with three segments. Further, the given representational data is shown to be collected from three (3) number of vehicles (i.e. vehicle 1, vehicle 2 and vehicle 3) which have traversed at least the target segment of the road previously in the predefined period of time (i.e., in the last day). A typical approach would have been to pass each vehicle's sensor information independently to the machine learning model. In such case, effectively for segment 1, the machine learning model would need to be called three (3) number of times in one day for that single segment which is very time consuming. The three (3) number of calls to the machine learning model, with each time passing the feature from a single vehicle along with map data, is made as follows. In first call to machine learning for prediction, all the features from vehicle 1 (i.e. d1, me1, ma1, . . . ) and the map feature (i.e. FC1, 3,100) are passed to the machine learning model and the model will predict PD ON or PD OFF for segment 1. Similarly, second call to machine learning for prediction, all the features from vehicle 2 (i.e. d2, me2, ma2, . . . ) and the map feature (i.e. FC2, 4, 80) are passed to the machine learning model and the model will predict PD ON or PD OFF for segment 2. Yet again, third call to machine learning for prediction, all the features from vehicle 3 (i.e. d3, me3, ma3, . . . ) and the map feature (i.e. FC3, 3, 60) are passed to the machine learning model and the model will predict PD ON or PD OFF for segment 3. Generally, in typical approach, if there are 'n' vehicle observations within a day then 'n' number of calls are required to the machine learning model and the machine learning model will make 'n' predictions for the same segment (e.g. segment 1 in this case); although for the 'n' number of calls to the machine learning model, the same map data is employed. For example, with some segments having thousands of observations in one day, the typical training of machine learning model may require calls to be made thousands of time for a single segment, which is not feasible.

In the present embodiments, the aggregated values, from the vehicular sensor data, is generated as discussed hereinafter. For continuous data, such as, distance in meters, median, maximum, minimum, standard deviation, and consistency, etc., the data processing module 405 would take the mean across all three vehicles. For example, for distance, the aggregated feature would be (d1+d2+d3)/3; and similarly, the other aggregated features would be (me1+me2+me3)/3, (ma1+ma2+ma3)/3, (mi1+mi2+mi3)/3, (sd1+sd2+sd3)/3 and (c1+c2+c3)/3. For categorical sensor data, such as PD flag and event type, the voting algorithms is considered for aggregating the vehicular sensor data and the category with the highest vote wins. Herein, the PD flag "ON" represents positive observation for the physical divider on the given segment of the road, and the PD flag "OFF" represents negative observation for the physical divider on the given segment of the road. In the present example, for PD flag, there are two observations for PD "ON" and only one observation for PD "OFF" (as listed in FIG. 7A); thus for segment 1, the aggregated PD flag feature would be PD "ON". Further, the event type could be one of "INITIAL," "UPDATE" and "CANCEL." Herein, the event type "INITIAL" represents reading(s) for the given segment of the road for generating the map therefor, the event type "UPDATE" represents reading for the given segment of the road for updating the corresponding map, and the event type "CANCEL" represents reading for the given segment of the road for cancelling the existing map. In the present examples, there are two observations for "UPDATE" and only one observation for "CANCEL" (as listed in FIG. 7A); thus for segment 1, the aggregated event type feature would be "UPDATE". Furthermore, the aggregated values for map data (as listed in FIG. 7B) would be FC1, number of lanes would be equal to '3' and the speed limit would be equal to '100'.

It may be appreciated that the method 500 of the present disclosure using the aggregated values would be required to make only limited number of calls, such as only one call, to the machine learning model 115, and the machine learning model 115 will then make a single prediction for 'segment 1' (as discussed in the subsequent paragraphs). It may be appreciated that although the process has been described only for aggregation and extraction of data for 'segment 1', similar processes can also be applied for aggregation and extraction of data for 'segment 2' and 'segment 3' without any limitations.

In step 505, the method 500 includes generating output data corresponding to presence of the physical divider. This may include predicting presence of the physical divider in the at least one segment of the road by a machine learning model (such as, the machine learning model 115) based on the one or more aggregated values as an input to the machine learning model. For this purpose, the one or more aggregated values are passed to the machine learning module 407. The machine learning module 407 may process the one or more aggregated values to generate a feature vector comprising the attributes indicated in the vehicular sensor data, the map data, or a combination thereof. This feature vector may then be provided as an input to the machine learning model 115. When used for training the machine learning model 115, the feature vector may be part of a training data set. When used for actual prediction, the feature vector is provided as an input to a trained machine learning model 115 for predicting the presence/absence of a physical divider 107 at a corresponding segment of interest.

The present approach of aggregating the features and passed once to the machine learning model provides fast map updates for each segment in the map. In one embodiment, the rankings for various features (as described above) according to their predictive index is given below in Table 1.

TABLE 1

| Feature No | Feature name | Feature type |
| --- | --- | --- |
| 2 | Display bits | Map features |
| 7 | Functional class | Map features |
| 12 | Speed category | Map features |
| 6 | From reference number lane | Map features |
| 3 | To reference speed limit | Map features |

TABLE 1-continued

| Feature No | Feature name | Feature type |
|---|---|---|
| 4 | From reference speed limit | Map features |
| 5 | To reference number lane | Map features |
| 1 | Access bits | Map features |
| 8 | Long haul | Map features |
| 13 | Divider | Map features |
| 11 | Lane category | Map features |
| 10 | Intersection category | Map features |
| 15 | From reference physical num lane | Map features |
| 14 | To reference physical num lane | Map features |
| 9 | Stub link | Map features |
| 0 | Special attributes | Map features |
| 19 | median | Sensor feature |
| 16 | Distance in meters | Sensor feature |
| 17 | Consistency | Sensor feature |
| 21 | Standard deviation | Sensor feature |
| 18 | Flag | Sensor feature |
| 20 | Recognition | Sensor feature |

In some examples, with respect to the training use case, after creating the feature vector as described above for inclusion in a training data set, the machine learning module 407 retrieves ground truth data about a physical divider 107 for the segment of the road. The ground truth data, for instance, indicates a true presence or a true absence of the physical divider 107 on the segment of the road of interest. The machine learning module 407 processes the sensor data, the map data, or a combination thereof in view of the ground truth data to train the machine learning model 115 to predict the physical divider using the map data, the sensor data, or a combination thereof as an input. As previously discussed, the machine learning model 115 can be based on any supervised learning model (e.g., Random Forest, Decision Tree, Neural Net, Deep Learning, logistic regression, etc.). For example, in the case of a neural network, the machine learning model 115 can consist of multiple layers or collections of one or more neurons (e.g., processing units of the neural network) corresponding to a feature or attribute of the input data (e.g., the feature vector generated from the map and/or vehicular sensor data as described above).

This ground truth data can be collected using traditional or equivalent techniques (e.g., manual human annotation of a collected sensor data observation to indicate presence or absence of a physical divider 107 and/or its type or characteristics). For example, a map service provider can operate a fleet of map data collection vehicles that can more sophisticated, accurate, or different types of sensors (e.g., radar, cameras, LiDAR, etc.) than would normally be available in customer vehicles. As described above, the physical divider is a fixed roadside or a median structure that separates different traffic flow directions or types (e.g., vehicular traffic vs. non-vehicular traffic). In one embodiment, only segments for which ground truth data is collected or otherwise available are selected for training the machine learning model. In one example, when independent ground truth data is not available or otherwise not used, the machine learning module 407 can use the underlying sensor data individually to estimate whether a physical divider is present or absent on the corresponding road segment. For example, image recognition can be performed on camera sensor data collected from a vehicle traveling the road segment. If image recognition results in detecting the presence or absence a physical divider in the image data, the results can be used as pseudo-ground truth data to train the machine learning classifier. In this way, when operating with independent ground truth data, map and sensor data collected from one road segment can be used to train the machine learning model 115 to predict the presence or absence of physical dividers on other road segments.

During training, the machine learning module 407 uses a learner module that feeds feature vectors from the training data set (e.g., created from map and/or sensor data as described above) into the machine learning model 115 to compute a predicted matching feature (e.g., physical divider and/or other related characteristic to be predicted) using an initial set of model parameters. For example, the target prediction for the machine learning model 115 can be whether there is a physical divider present for a given segment (e.g., 5-meter segment) of a road of interest. In one embodiment, the machine learning model 115 can also be used to model or predict shape, distance from vehicle to the physical divider (e.g., from a vehicle reference point such as the rear axle), and/or other attributes of the physical divider 107 if the ground truth data contains attributes or feature labels.

In addition or alternatively, the machine learning model 115 can be used to predict a road characteristic related to the physical divider. For example, the road characteristic related to the physical divider may include, but is not limited to, a probability of oncoming traffic (OPPO), a presence of vulnerable road users (VRU), or a combination thereof. In one embodiment, the prediction can be a binary prediction (e.g., physical divider/OPPO/VRU present or physical divider/OPPO/VRU absent). In another embodiment, prediction can be a probability of the physical divider/OPPO/VRU being present or absent (e.g., spanning a numerical range from 0 to 1, with 0 being no probability and 1 being the highest probability).

In one embodiment, based on the collected map and/or sensor data, the physical divider platform 113 predicts the presence or absence of the physical dividers 307a-307b using a trained machine learning model (e.g., machine learning model 115) for each segment 305 to store in the physical divider overlay 301. Table 2 below illustrates an example of the predictions based on the example of FIG. 3:

TABLE 2

| Segment | Physical Divider 307a | Physical Divider 307b |
|---|---|---|
| 305a | Present | Present |
| 305b | Present | Present |
| 305c | Present | Present |
| 305d | Present | Present |
| 305e | Absent | Present |
| 305f | Absent | Present |

In some embodiments, the machine learning module 407 uses the trained machine learning model 115 to a generate a physical divider overlay of a map representation of a road network. For example, the machine learning module 407 can interact with the sensor data ingestion module 401 and map data module 403 receive sensor data observations from OEM providers and/or vehicles traveling in the road network. The observations can then be used an input into the trained machine learning model 115 as discussed in more detailed below with respect to FIG. 5B. In one embodiment, the physical divider overlay indicates a presence or an absence of one or more physical dividers in the road network of the map representation. In one embodiment, the physical divider overlay can also include other data related to a presence or an absence of one or more physical dividers in the road network of the map representation such as a probability of oncoming traffic (OPPO), a presence of vulnerable road users (VRU), or a combination thereof as previously discussed.

In other words, in one embodiment, given the training data above, the physical divider platform 113 can run a batch process (e.g., every 1 day or any other predefined period of time) and extract the feature vectors as described above, and pass the feature vectors to the already trained machine learning model 115. The trained machine learning model 115 will output whether the road segment (e.g., 5-meter segment) corresponding to the input feature vector contains a physical divider or not. In one embodiment, the data publication module 409 can then publish the physical divider overlay in the geographic database 111 or equivalent for access by end users (e.g., OEMs, vehicles, etc.).

In one embodiment, the predicted physical divider 107 can then be used to determine how to operate an autonomous vehicle. For example, if a physical divider 107 is predicted to be present based on map data and/or vehicle sensor data on a road segment (e.g., because no previously determined ground truth data on physical dividers is available for the road segment), then a more autonomous operation of the vehicle can be disabled, and the driver is expected to drive in more of a manual mode (e.g., requiring the driver to hold the steering wheel as the vehicle operates otherwise in autonomous mode, or to disable some or all autonomous operations). In one embodiment, other use cases include updating the physical divider overlay 301 and/or geographic database 111 with the newly detected physical dividers. It is noted that these uses cases are provided by way of illustration and not as limitations. Accordingly, it is contemplated that the predicted physical divider information and/or related predicted attributes (e.g., OPPO, VRU, etc.), can be used for any other use case, application, and/or service.

FIG. 5B is a flowchart of a process 520 for controlling an autonomous vehicle using prediction of presence or absence of physical dividers by a trained machine learning model, such as the machine learning model 115, according to one embodiment. In various embodiments, the physical divider platform 113, physical divider module 119, and/or any of the modules 401-411 may perform one or more portions of the process 520 and may be implemented in, for instance, a chip set including a processor and a memory as shown in FIG. 12. As such, physical divider platform 113, physical divider module 119, and/or any of the modules 401-411 can provide means for accomplishing various parts of the process 520, as well as means for accomplishing embodiments of other processes described herein in conjunction with other components of the system 100. Although the process 520 is illustrated and described as a sequence of steps, its contemplated that various embodiments of the process 520 may be performed in any order or a combination and need not include all of the illustrated steps.

In step 521, the sensor data ingestion module 401 and/or the map data module 403 collect map data, sensor data, or a combination thereof from a vehicle traveling on a road segment. This step is equivalent to step 501 of the method 500 described above. However, in this use, the road segment of interest is a road segment for which a prediction of a physical divider 107 or other related characteristic is requested.

In step 523, the machine learning module 407 processes the map data, the sensor data, or a combination thereof using a machine learning model, such as the machine learning model 115, to predict a presence or an absence of a potential physical divider on the target road segment. In one embodiment, the map data, sensor data, and/or any combination determined therefrom are used to generate a feature vector of the attributes of the collected data as an input into the trained machine learning model 115. In one embodiment, the machine learning model is trained using training map data, training sensor data, or a combination thereof and ground truth data regarding a true presence or a true absence of a reference physical divider as described above with respect to the method 500.

In step 525, the vehicle control module 411 activates or deactivates an autonomous driving mode of the vehicle based on the predicted presence or the predicted absence of the physical divider. In addition, or alternatively, the vehicle control module 411 can present a notification to the driver or occupant of the vehicle prior to activating or deactivating the autonomous mode. For example, the notification can alert the driver that a change in the autonomous mode will occur shortly (e.g., within a specified period of time). In another example, the notification can provide the driver an option to accept or reject the pending change in autonomous driving mode, or select other alternatives (e.g., reroute the vehicle to road segments with physical dividers, etc.). In one embodiment, the autonomous driving mode is deactivated based on the predicted presence of the physical divider, and activated based on the predicted absence of the physical divider. By way of example, the vehicle can be an autonomous vehicle or highly assisted driving vehicle that is capable of sensing its environment and navigating within a road network without driver or occupant input. It is noted that autonomous vehicles and highly assisted driving vehicles are part of a spectrum of vehicle classifications that can span from no automation to fully autonomous operation. For example, the U.S. National Highway Traffic Safety Administration ("NHTSA") in its "Preliminary Statement of Policy Concerning Automated Vehicles," published 2013, defines five levels of vehicle automation:

Level 0 (No-Automation)—"The driver is in complete and sole control of the primary vehicle controls—brake, steering, throttle, and motive power—at all times.";

Level 1 (Function-specific Automation)—"Automation at this level involves one or more specific control functions. Examples include electronic stability control or pre-charged brakes, where the vehicle automatically assists with braking to enable the driver to regain control of the vehicle or stop faster than possible by acting alone.";

Level 2 (Combined Function Automation)—"This level involves automation of at least two primary control functions designed to work in unison to relieve the driver of control of those functions. An example of combined functions enabling a Level 2 system is adaptive cruise control in combination with lane centering.";

Level 3 (Limited Self-Driving Automation)—"Vehicles at this level of automation enable the driver to cede full control of all safety-critical functions under certain traffic or environmental conditions and in those conditions to rely heavily on the vehicle to monitor for changes in those conditions requiring transition back to driver control. The driver is expected to be available for occasional control, but with sufficiently comfortable transition time."; and Level 4 (Full Self-Driving Automation)—"The vehicle is designed to perform all safety-critical driving functions and monitor roadway conditions for an entire trip. Such a design anticipates that the driver will provide destination or navigation input, but is not expected to be available for control at any time during the trip. This includes both occupied and unoccupied vehicles."

In one embodiment, the various embodiments described herein are applicable to vehicles that are classified in any of the levels of automation (levels 0-4) discussed above. For example, in the case of autonomous modes of operation, the vehicle can automatically react to detected physical dividers, OPPO, VRU, etc. (e.g., by automatically rerouting, slowing down, etc.). Even in the case of completely manual driving (e.g., level 0), the vehicle can present an alert or notification of any detected physical dividers, OPPO, VRU, etc. to provide greater situational awareness and improve safety for drivers.

In another use case of a physical divider prediction, in addition to or instead of autonomous vehicle control, the data publication module 409 can initiate an update of physical divider overlay of a map database based on the predicted presence or the predicted absence of the physical divider, OPPO, VRU, etc. on the road segment (step 527). For example, if the segment has been previously unmapped, the predicted physical divider/OPPO/VRU can be transmitted for possible inclusion in physical divider overlay of the geographic database 111. The physical divider platform 113 can use any criteria for determining whether a new physical divider prediction should be incorporated into an existing physical divider overlay. For example, if the report is from a trusted vehicle (e.g., a mapping vehicle operated by a map provider), a single prediction can be used to update the overlay. If the report is from a user vehicle, the physical divider platform 113 may update the overlay only if the report meets predetermined criteria (e.g., confirmed by a predetermined number of other user vehicles, has calculated probability above a threshold value, etc.).

FIGS. 8A and 8B are diagrams of example architectures for providing machine learning of physical dividers, according to one embodiment. FIG. 8A illustrates an example architecture 801 in which the machine learning model 115 is instantiated on a network component (e.g., the physical divider platform 113). In this way, the processing needed by the machine learning model 115 is provided on the server side, where computing resources (e.g., processing power, memory, storage, etc.) is generally greater than at a local component (e.g., the vehicle 103).

Under the architecture 801, an OEM platform 803 (e.g., operated by automobile manufacturer) collects sensor data observations from vehicles as they travel in a road network. The OEM platform 803 sends the observations to the physical divider platform 113 (e.g., typically operated by a map or other service provider) for ingestion and archival. The physical divider platform 113 (e.g., where the trained machine learning model 115 is instantiated) trains the machine learning model 115 and thereafter processes the received observations using the machine learning model 115 to predict physical dividers, OPPO, VRU, etc. These physical divider/OPPO/VRU predictions are then fused map attribute information to produce the physical divider overlay 805. The physical divider platform 113 can then publish the physical divider overlay 805 for delivery to the vehicle 103 either directly or through the OEM platform 803.

FIG. 8B illustrates an alternative architecture 821 in which no physical divider overlay is delivered to the vehicle 103. Instead, a trained machine learning model 115 is instantiated at a local component or system of a vehicle 103 traveling the road network. In this way, the local component uses the machine learning model 115 to provide a local prediction of the physical divider (e.g., physical divider predictions 823) based on locally collected map and/or sensor data. In one use case, the local prediction of the physical divider is used to activate or deactivate an autonomous driving mode of the vehicle and/or notify the driver that a change in autonomous mode may be needed as previously described.

As shown, to enable this architecture 821, the physical divider platform 113 trains the machine learning model 115 as previously described in the method 500. The physical divider platform 113 can then deliver the trained machine learning model 115 to the vehicle 103 either directly or through the OEM platform 801. A local system or component of the vehicle 103 then executes an instance of the trained machine learning model 115 to make physical divider/OPPO/VRU predictions locally at the vehicle 103. In this way, the vehicle is able detect or map physical dividers on the segments on which it is traveling when a physical divider overlay is not available or when the vehicle does not have communications to network-side components such as the physical divider platform 113 as it travels. In one embodiment, the as new training data is collect, an updated trained machine learning model 115 can be delivered to the vehicle 103 as needed, periodically, etc.

Figure 9B:
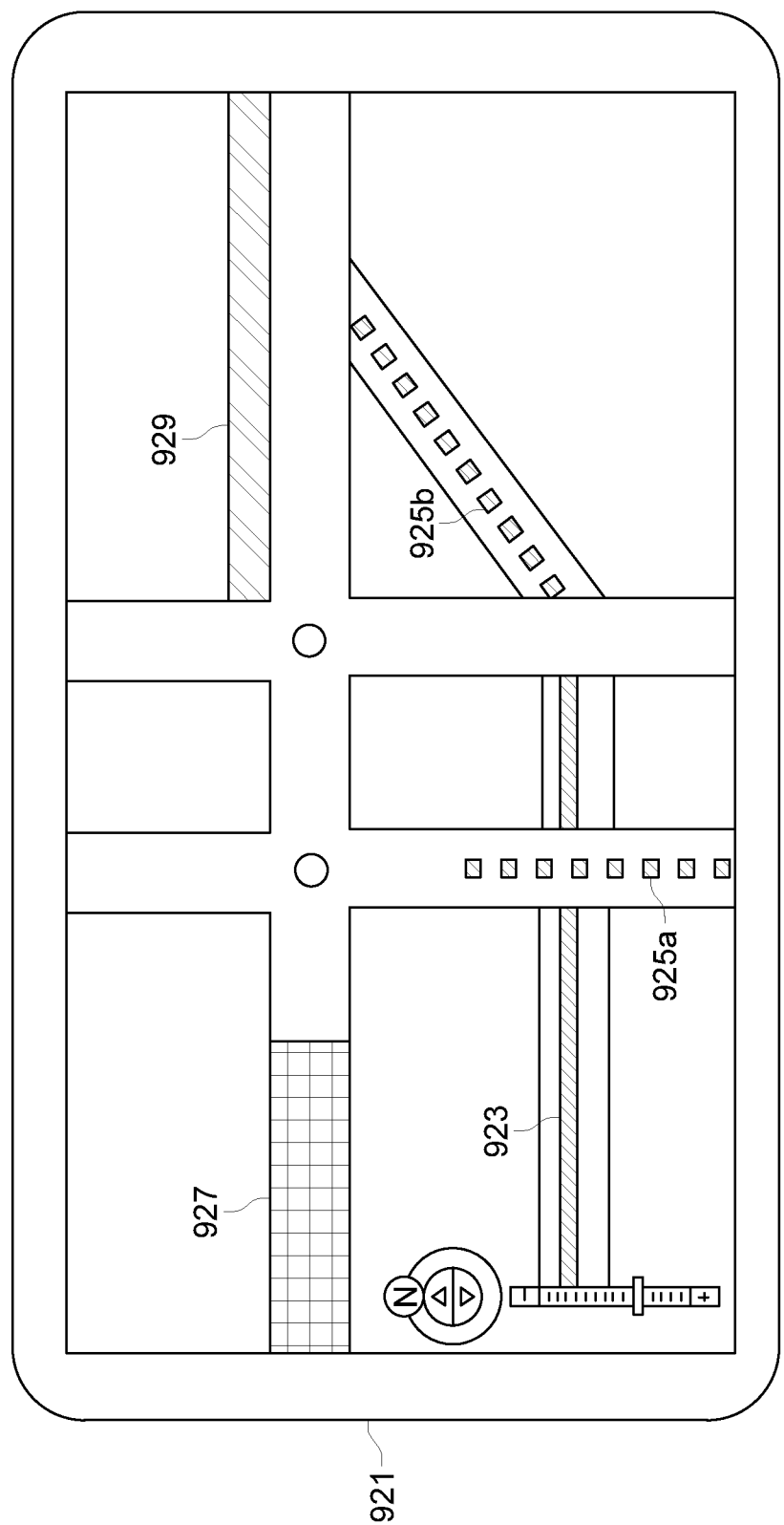

FIGS. 9A and 9B are diagrams of example user interfaces based on physical dividers predicted by machine learning, according to on embodiment. In the example of FIG. 9A, the vehicle 103 is traveling on a road segment that has not been previously mapped for the presence of any physical dividers between opposite traffic flow lanes. The vehicle 103 also is currently operating in autonomous driving mode. As the vehicle 103 approaches the segment, the vehicle sensors (e.g., camera, radar, etc.) collect sensor data. At the same time, the map data (e.g., functional class, speed category, etc.) about the road segment is also determined. A vehicle system 901 including trained machine learning model 115 (e.g., trained according to the embodiments described herein) then processes the map and sensor data to make a physical divider prediction. In this example, the machine learning model 115 predicts that there is no physical divider on the segment. This prediction then triggers the vehicle system 901 to present a notification or an alert message 905 to indicate that that the vehicle is approaching an area with no physical divider and instructs the driver to take manual control for the segment. In addition, the vehicle system 901 can deactivate the autonomous driving mode (e.g., following a period of time after presenting a notification such as the alert message 905).

FIG. 9B is a diagram illustrating an example user interface presenting a physical divider overlay, according to one embodiment. As shown, a display device 921 (e.g., connected to a vehicle or personal navigation system) presents a mapping display on which a physical divider overlay (e.g., generated according to the various embodiments described herein) is superimposed. In this example, the physical divider overlay includes information on which road segments have ground truth mapped physical dividers (e.g., segments indicated with a solid line 923) as well as physical dividers predicted by a trained machine learning model 115 (e.g., segments indicated with dashed lines 925a and 925b) according to the embodiments described herein. In addition, the physical overlay, includes data on segments with observed or predicted OPPO (e.g., indicated by shaded area 927) as well as observed or predicted VRU (e.g., indicated by shaded are 929).

Returning to FIG. 1, in one embodiment, the physical divider platform 113 has connectivity over a communication network 125 to the services platform 121 (e.g., an OEM platform) that provides one or more services 123 (e.g., sensor data collection services). By way of example, the services 123 may also be other third-party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services platform 121 uses the output (e.g. physical divider predictions) of the physical divider platform 113 to provide services such as navigation, mapping, other location-based services, etc.

In one embodiment, the physical divider platform 113 may be a platform with multiple interconnected components. The physical divider platform 113 may include multiple servers, intelligent networking devices, computing devices, components and corresponding software for providing parametric representations of lane lines. In addition, it is noted that the physical divider platform 113 may be a separate entity of the system 100, a part of the one or more services 123, a part of the services platform 121, or included within the vehicle 103 (e.g., a physical divider module 119).

In one embodiment, content providers 127a-127m (collectively referred to as content providers 127) may provide content or data (e.g., including geographic data, parametric representations of mapped features, etc.) to the geographic database 111, the physical divider platform 113, the services platform 121, the services 123, and the vehicle 103. The content provided may be any type of content, such as map content, textual content, audio content, video content, image content, etc. In one embodiment, the content providers 127 may provide content that may aid in the detecting and classifying of physical dividers or other related characteristics (e.g., OPPO, VRU, etc.). In one embodiment, the content providers 127 may also store content associated with the geographic database 111, physical divider platform 113, services platform 121, services 123, and/or vehicle 103. In another embodiment, the content providers 127 may manage access to a central repository of data, and offer a consistent, standard interface to data, such as a repository of the geographic database 111.

By way of example, the physical divider module 119 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the physical divider module 119 can support any type of interface to the user (such as "wearable" circuitry, etc.). In one embodiment, the physical divider module 119 may be associated with the vehicle 103 or be a component part of the vehicle 103.

In one embodiment, the vehicle 103 is configured with various sensors for generating or collecting vehicular sensor data, related geographic/map data, etc. In one embodiment, the sensed data represent sensor data associated with a geographic location or coordinates at which the sensor data was collected. In this way, the sensor data can act as observation data that can be separated into location-aware training and evaluation datasets according to their data collection locations. By way of example, the sensors may include a radar system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC), etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 103 may detect the relative distance of the vehicle from a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 103 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 125 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the physical divider platform 113, services platform 121, services 123, vehicle 103, and/or content providers 127 communicate with each other and other components of the system 100 using well known, new or still developing protocols. In this context, a protocol includes a set of rules defining how the network nodes within the communication network 125 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 10:
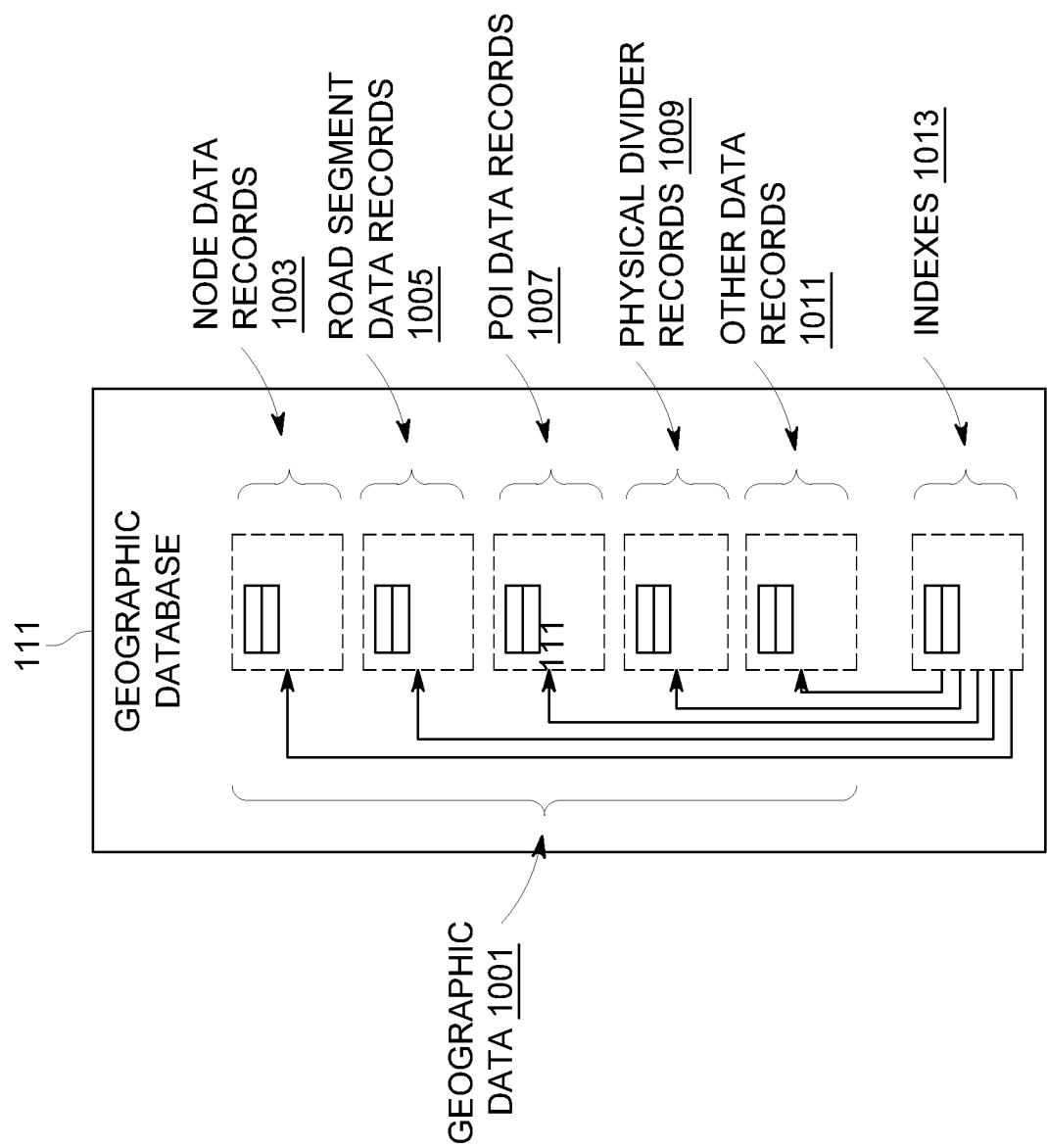
FIG. 10 is a diagram of a geographic database, according to one embodiment.

FIG. 10 is a diagram of a geographic database, according to one embodiment. In one embodiment, the geographic database 111 includes geographic data 1001 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 111.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 111 follows certain conventions. For example, links do not cross themselves and do not cross each other except at a node. Also, there are no duplicated shape points, nodes, or links. Two links that connect each other have a common node. In the geographic database 111, overlapping geographic features are represented by overlapping polygons. When polygons overlap, the boundary of one polygon crosses the boundary of the other polygon. In the geographic database 111, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 111 includes node data records 1003, road segment or link data records 1005, POI data records 1007, physical divider records 1009, other records 1011, and indexes 1013, for example. More, fewer or different data records can be provided. In one embodiment, additional data records (not shown) can include cartographic ("carto") data records, routing data, and maneuver data. In one embodiment, the indexes 1013 may improve the speed of data retrieval operations in the geographic database 111. In one embodiment, the indexes 1013 may be used to quickly locate data without having to search every row in the geographic database 111 every time it is accessed. For example, in one embodiment, the indexes 1013 can be a spatial index of the polygon points associated with stored feature polygons.

In exemplary embodiments, the road segment data records 1005 are links or segments representing roads, streets, or paths, as can be used in the calculated route or recorded route information for determination of one or more personalized routes. The node data records 1003 are end points corresponding to the respective links or segments of the road segment data records 1005. The road link data records 1005 and the node data records 1003 represent a road network, such as used by vehicles, cars, and/or other entities. Alternatively, the geographic database 111 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 111 can include data about the POIs and their respective locations in the POI data records 1007. The geographic database 111 can also include data about places, such as cities, towns, or other communities, and other geographic features, such as bodies of water, mountain ranges, etc. Such place or feature data can be part of the POI data records 1007 or can be associated with POIs or POI data records 1007 (such as a data point used for displaying or representing a position of a city).

In one embodiment, the geographic database 111 can also include physical divider records 1009 for storing predicted physical dividers, OPPO, VRU, and/or other related road characteristics. The predicted data, for instance, can be stored as attributes or data records of a physical divider overlay, which fuses with the predicted attributes with map attributes or features. In one embodiment, the physical divider records 1009 can be associated with segments of a road link (as opposed to an entire link). It is noted that the segmentation of the road for the purposes of physical divider prediction can be different than the road link structure of the geographic database 111. In other words, the segments can further subdivide the links of the geographic database 111 into smaller segments (e.g., of uniform lengths such as 5-meters). In this way, physical dividers/OPPO/VRU can be predicted and represented at a level of granularity that is independent of the granularity or at which the actual road or road network is represented in the geographic database 111. In one embodiment, the physical divider records 1009 can be associated with one or more of the node records 1003, road segment records 1005, and/or POI data records 1007; or portions thereof (e.g., smaller or different segments than indicated in the road segment records 1005) to provide situational awareness to drivers and provide for safer autonomous operation of vehicles. In this way, the predicted physical dividers/OPPO/VRU/etc. stored in the physical divider records 1009 can also be associated with the characteristics or metadata of the corresponding record 1003, 1005, and/or 1007.

In one embodiment, the geographic database 111 can be maintained by the content provider 127 in association with the services platform 121 (e.g., a map developer). The map developer can collect geographic data to generate and enhance the geographic database 111. There can be different ways used by the map developer to collect data. These ways may include obtaining data from other sources, such as municipalities or respective geographic authorities. In addition, the map developer can employ field personnel to travel by vehicle along roads throughout the geographic region to observe features (e.g., physical dividers, OPPO, VRU, etc.) and/or record information about them, for example. Also, remote sensing, such as aerial or satellite photography, can be used.

The geographic database 111 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing machine learning of physical dividers may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 11:
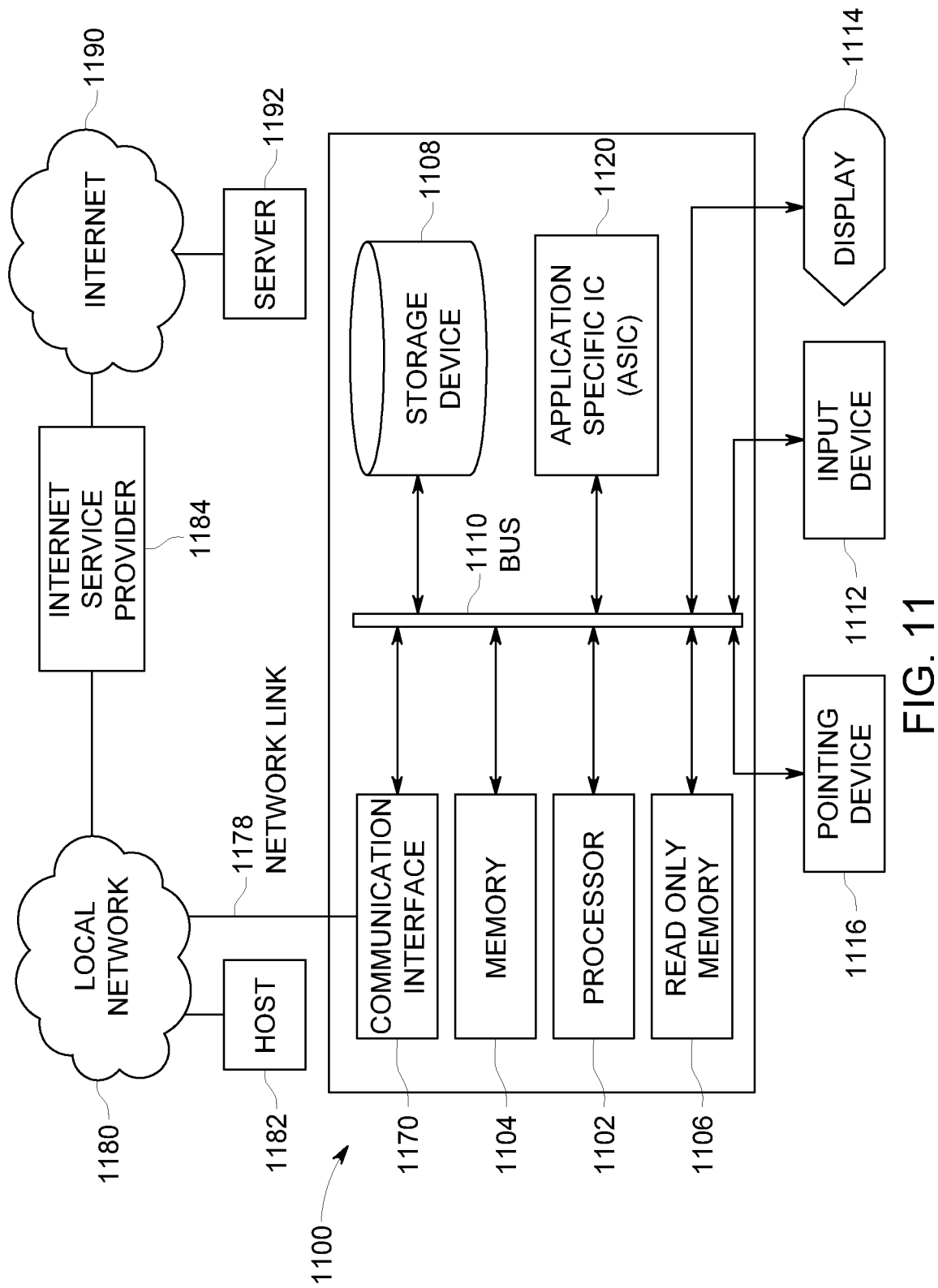
FIG. 11 is a diagram of hardware that can be used to implement an embodiment.

FIG. 11 illustrates a computer system 1100 upon which an embodiment of the invention may be implemented. Computer system 1100 is programmed (e.g., via computer program code or instructions) to provide machine learning of physical dividers as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1110 includes one or more parallel conductors of information so that information is transferred quickly among devices coupled to the bus 1110. One or more processors 1102 for processing information are coupled with the bus 1110.

A processor 1102 performs a set of operations on information as specified by computer program code related to providing machine learning of physical dividers. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or other dynamic storage device, stores information including processor instructions for providing machine learning of physical dividers. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing prediction of physical dividers, is provided to the bus 1110 for use by the processor from an external input device 1112, such as a keyboard containing alphanumeric keys operated by a human user, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT) or a liquid crystal display (LCD), or plasma screen or printer for presenting text or images, and a pointing device 1116, such as a mouse or a trackball or cursor direction keys, or motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 may also include one or more instances of a communications interface 1170 coupled to bus 1110. Communication interface 1170 provides a one-way or two-way communication coupling to a variety of external devices that operate with their own processors, such as printers, scanners and external disks. In general, the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 125 for providing machine learning of physical dividers.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 12 illustrates a chip set 1200 upon which an embodiment of the invention may be implemented. Chip set 1200 is programmed to provide machine learning of physical dividers as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide machine learning of physical dividers. The memory 1205 also stores the data associated with or generated by the execution of the inventive steps.

Figure 13:
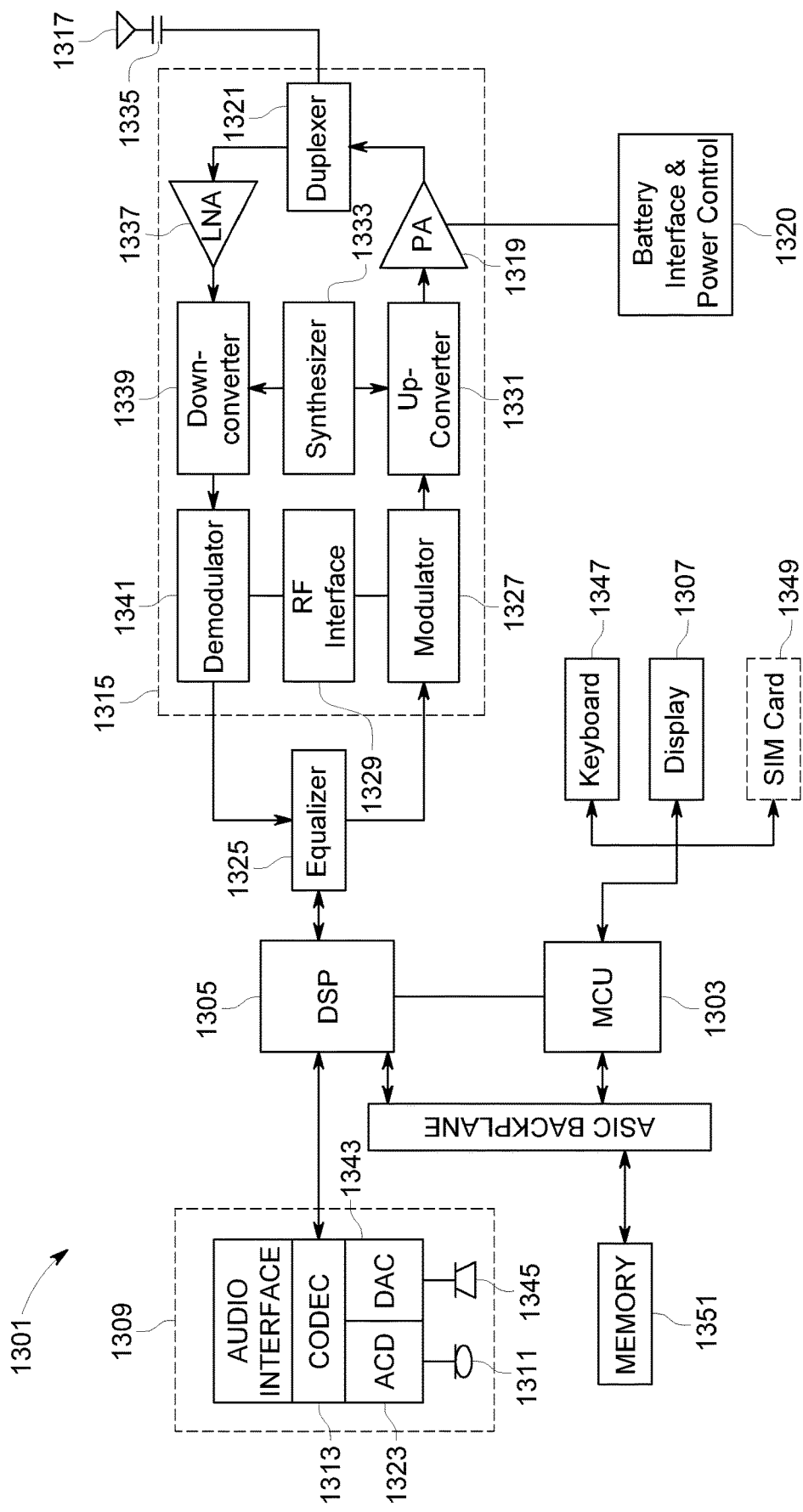
FIG. 13 is a diagram of a mobile terminal (e.g., handset or vehicle or part thereof) that can be used to implement an embodiment.

FIG. 13 is a diagram of exemplary components of a mobile station 1301 (e.g., handset, vehicle or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile station functions that offer automatic contact matching. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile station 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (Wi-Fi), satellite, and the like.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303—which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile station 1301 to provide machine learning of physical dividers. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the station. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile station 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1351 may be, but not limited to, a single memory, CD, DVD, ROM, RAM, EEPROM, optical storage, or any other non-volatile or non-transitory storage medium capable of storing digital data.

An optionally incorporated SIM card 1349 carries, for instance, important information, such as the cellular phone number, the carrier supplying service, subscription details, and security information. The SIM card 1349 serves primarily to identify the mobile station 1301 on a radio network. The card 1349 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for prediction of a physical divider on a road, comprising:
    retrieving vehicular sensor data and map data captured over a predefined period of time for at least one segment of the road, wherein the vehicular sensor data comprises continuous vehicular sensor data including physical divider average distance, physical divider maximum distance, physical divider minimum distance, or a combination thereof;
    aggregating the respective vehicular sensor data and map data for the at least one segment of the road to generate one or more aggregated values;
    determining at least one of a standard deviation and a mean of each of physical divider average distance, physical divider maximum distance, physical divider minimum distance, or the combination thereof;
    generating the one or more aggregated values based on the determined at least one of the standard deviation and the mean of each of physical divider average distance, physical divider maximum distance, physical divider minimum distance, or the combination thereof; and
    generating, output data corresponding to presence of the physical divider in the at least one segment of the road, by a machine learning model based on the one or more aggregated values as an input to the machine learning model.

2. The method of claim 1, wherein the vehicular sensor data comprises categorical vehicular sensor data including a physical divider measurement event type, a physical divider flag, or a combination thereof.

3. The method of claim 2 further comprising:
    selecting categorical values, using a voting algorithm, for each of the physical divider measurement event type, the physical divider flag, or the combination thereof; and
    generating the one or more aggregated values based on the selected categorical values for each of the physical divider measurement event type, the physical divider flag, or the combination thereof.

4. The method of claim 1, wherein the map data includes a functional class, a speed limit, a presence of a road sign, a bi-directionality, a number of lanes, a speed category, a distance to a point of interest, or a combination thereof.

5. The method of claim 1, wherein the generated one or more aggregated values are collected over an extended period of time for use in training of the machine learning model.

6. The method of claim 5, wherein the extended period of time is larger than the predefined period of time.

7. The method of claim 1, further comprising retrieving the vehicular sensor data from one of an original equipment manufacturer (OEM) cloud or a plurality of in-vehicle sensors installed in multiple vehicles traveling on the road.

8. The method of claim 1, wherein the aggregating further comprises uniforming the retrieved vehicular sensor data.

9. The method of claim 1, further comprising notifying a user of a vehicle travelling on the at least one segment of the road regarding a transition between an autonomous driving mode of the vehicle and a manual driving mode of the vehicle based on the generated output data.

10. A system for prediction of a physical divider on a road, comprising:
    at least one memory configured to store instructions; and
    at least one processor configured to execute the instructions to:
        retrieve vehicular sensor data and map data captured over a predefined period of time for at least one segment of the road, wherein the vehicular sensor data comprises continuous vehicular sensor data including physical divider average distance, physical divider maximum distance, physical divider minimum distance, or a combination thereof;
        aggregate the respective vehicular sensor data and map data for the at least one segment of the road to generate one or more aggregated values;
        determine at least one of a standard deviation and a mean of each of physical divider average distance, physical divider maximum distance, physical divider minimum distance, or the combination thereof;
        generate the one or more aggregated values based on the determined at least one of the standard deviation and the mean of each of physical divider average distance, physical divider maximum distance, physical divider minimum distance, or the combination thereof; and
        generate, output data corresponding to presence of the physical divider in the at least one segment of the road, by a machine learning model based on the one or more aggregated values as an input to the machine learning model.

11. The system of claim 10, wherein the at least one processor is further configured to retrieve the vehicular sensor data from one of an original equipment manufacturer (OEM) cloud or a plurality of in-vehicle sensors installed in multiple vehicles travelling on the road.

12. The system of claim 10, wherein the vehicular sensor data comprises categorical vehicular sensor data including a physical divider measurement event type, a physical divider flag, or a combination thereof, and wherein the at least one processor is further configured to:
   select, based on a voting algorithm, categorical values for each of the physical divider measurement event type, the physical divider flag, or the combination thereof; and
   generate the one or more aggregated values based on the selected categorical values for each of the physical divider measurement event type, the physical divider flag, or the combination thereof.

13. The system of claim 10, wherein the generated one or more aggregated values are collected over an extended period of time for use in training of the machine learning model.

14. The system of claim 10, wherein the at least one processor is further configured to notify a user of a vehicle travelling on the at least one segment of the road regarding a transition between an autonomous driving mode of the vehicle and a manual driving mode of the vehicle, based on the generated output data.

15. The system of claim 10, wherein the map data includes a functional class, a speed limit, a presence of a road sign, a bi-directionality, a number of lanes, a speed category, a distance to a point of interest, or a combination thereof.

16. A non-transitory computer-readable storage medium having stored thereon, computer-executable instructions, which when executed by a computer, cause the computer to perform operations for predicting a physical divider on a road, the operations comprising:
   retrieving vehicular sensor data, map data, or a combination thereof captured over a predefined period of time for at least one segment of the road, wherein the vehicular sensor data comprises continuous vehicular sensor data including physical divider average distance, physical divider maximum distance, physical divider minimum distance, or a combination thereof;
   aggregating the respective vehicular sensor data, map data, or the combination thereof for the at least one segment of the road to generate one or more aggregated values;
   selectively determining at least one of a standard deviation and a mean of each of physical divider average distance, physical divider maximum distance, physical divider minimum distance, or the combination thereof;
   selectively generating the one or more aggregated values based on the determined at least one of the standard deviation and the mean of each of physical divider average distance, physical divider maximum distance, physical divider minimum distance, or the combination thereof; and
   generating, output data corresponding to presence of the physical divider in the at least one segment of the road, by a machine learning model based on the one or more aggregated values as an input to the machine learning model.

17. The non-transitory computer-readable storage medium of claim 16, wherein the operations further comprise notifying a user of a vehicle travelling on the at least one segment of the road regarding a transition between an autonomous driving mode of the vehicle and a manual driving mode of the vehicle based on the generated output data.

18. The non-transitory computer-readable storage medium of claim 16, wherein the vehicular sensor data comprises categorical vehicular sensor data including a physical divider measurement event type, a physical divider flag, or a combination thereof.

19. The non-transitory computer-readable storage medium of claim 18, further comprising:
   selecting categorical values, using a voting algorithm, for each of the physical divider measurement event type, the physical divider flag, or the combination thereof; and
   generating the one or more aggregated values based on the selected categorical values for each of the physical divider measurement event type, the physical divider flag, or the combination thereof.

20. The non-transitory computer-readable storage medium of claim 16, wherein the generated one or more aggregated values are collected over an extended period of time for use in training of the machine learning model, and wherein the extended period of time is larger than the predefined period of time.

* * * * *